US012722226B2

(12) United States Patent
Grossmann et al.

(10) Patent No.: US 12,722,226 B2
(45) Date of Patent: Sep. 1, 2026

(54) APPARATUS FOR BEAM-INFLUENCING A LASER BEAM

(71) Applicant: TRUMPF Laser GmbH, Schramberg (DE)

(72) Inventors: Daniel Grossmann, Schramberg (DE); Malte Kumkar, Weimar (DE)

(73) Assignee: TRUMPF LASER GMBH, Schramberg (DE)

( * ) Notice: Subject to any disclaimer, the term of this patent is extended or adjusted under 35 U.S.C. 154(b) by 664 days.

(21) Appl. No.: 18/337,071

(22) Filed: Jun. 19, 2023

(65) Prior Publication Data

US 2023/0330770 A1 Oct. 19, 2023

Related U.S. Application Data

(63) Continuation of application No. PCT/EP2021/084568, filed on Dec. 7, 2021.

(30) Foreign Application Priority Data

Dec. 21, 2020 (DE) ..................... 10 2020 134 422.8

(51) Int. Cl.
*B23K 26/0622* (2014.01)
*B23K 26/064* (2014.01)

(52) U.S. Cl.
CPC ........ *B23K 26/064* (2015.10); *B23K 26/0624* (2015.10)

(58) Field of Classification Search
CPC .............. B23K 26/064; B23K 26/0624; B23K 26/0648; B23K 26/0652; B23K 26/067;
(Continued)

(56) References Cited

U.S. PATENT DOCUMENTS 5,741,580 A * 4/1998 Hayamizu ............... C23C 14/28 428/221
7,078,650 B2 7/2006 Gross
(Continued)

FOREIGN PATENT DOCUMENTS

DE 102013201968 A1 8/2014
DE 112017004557 T5 5/2019
(Continued)

OTHER PUBLICATIONS

Victor Argueta, Deciphering 4f Optical Systems: A Journey into Fourier Optics—Optics for Hire, 2024, OFH, p. 1 (Year: 2024).*

*Primary Examiner* — Tiffany T Tran
(74) *Attorney, Agent, or Firm* — LEYDIG, VOIT & MAYER, LTD.

(57) ABSTRACT

An apparatus for influencing a laser beam from an ultrashort pulse laser includes a pulse-precise deflector unit configured to deflect the laser beam in at least one direction perpendicular to a beam propagation direction, a transformation optics arrangement having at least two components arranged downstream of the pulse-precise deflector unit. The transformation optics arrangement is configured to transform a spatial deflection and/or an angular deflection of the laser beam into the angular deflection and/or the spatial deflection, and/or transform the spatial deflection and the angular deflection inversely, by using a space-to-angle transformation and/or an angle-to-space transformation. The apparatus further includes a processing optical unit arranged downstream of the transformation optics arrangement and configured to guide the laser beam into an image-side focal plane of the processing optical unit.

17 Claims, 15 Drawing Sheets

(58) Field of Classification Search

CPC .. B23K 26/082; G02B 5/1809; G02B 5/1828; G02B 26/0808; G02B 26/105; G02B 26/106; G02F 1/2955

See application file for complete search history.

(56) References Cited

U.S. PATENT DOCUMENTS

| | | | | |
|---|---|---|---|---|
| 7,176,409 | B2 | 2/2007 | Gross et al. | |
| 7,445,974 | B2 | 11/2008 | Tanaka | |
| 8,026,158 | B2 | 9/2011 | Bruland et al. | |
| 8,455,790 | B2 | 6/2013 | Tanaka et al. | |
| 8,680,430 | B2 | 3/2014 | Unrath | |
| 9,069,227 | B2 * | 6/2015 | Kirkby | G02F 1/113 |
| 9,442,286 | B2 | 9/2016 | Li et al. | |
| 10,388,026 | B1 | 8/2019 | Chao et al. | |
| 2005/0270630 | A1 | 12/2005 | Johnson | |
| 2006/0133222 | A1 * | 6/2006 | Lin | G03F 7/70325 369/30.01 |
| 2010/0301023 | A1 | 12/2010 | Unrath et al. | |
| 2012/0241427 | A1 * | 9/2012 | Maltsev | B23K 26/0732 219/121.85 |
| 2015/0338718 | A1 | 11/2015 | Zhang et al. | |
| 2017/0242232 | A1 * | 8/2017 | Leger | G02B 21/0076 |
| 2017/0336697 | A1 | 11/2017 | Peled et al. | |
| 2019/0193197 | A1 | 6/2019 | Ishikawa et al. | |
| 2019/0285865 | A1 | 9/2019 | Rozsa et al. | |

FOREIGN PATENT DOCUMENTS

| | | | |
|---|---|---|---|
| DE | 102019116803 | A1 | 12/2020 |
| JP | 2019-98 357 | A | 6/2019 |
| WO | WO 2016075681 | A1 | 5/2016 |
| WO | WO 2019028064 | A1 | 2/2019 |
| WO | WO 2020178813 | A1 | 9/2020 |

* cited by examiner x
y
324
3
β
322
32
320
304
302
α
300
30
20

4
3
E1
F1
E2
F2
E3
6,7,8

2f
4f
6f
8f
I
x

I
x 6
200

200
6

200
6

34

6
30, 32
20

APPARATUS FOR BEAM-INFLUENCING A LASER BEAM

CROSS REFERENCE TO RELATED APPLICATIONS

This application is a continuation of International Application No. PCT/EP2021/084568 (WO 2022/135909 A1), filed on Dec. 7, 2021, and claims benefit to German Patent Application No. DE 10 2020 134 422.8, filed on Dec. 21, 2020. The aforementioned applications are hereby incorporated by reference herein.

FIELD

Embodiments of the present invention relate to an apparatus for beam-influencing a laser beam, in particular for use with an ultrashort pulse laser at higher average powers.

BACKGROUND

For processing materials, ultrashort pulse lasers can be used in which the laser energy introduced into the material to be processed brings about the desired material processing. In this case, the laser beam and the material are moved relative to one another with a feed along a feed trajectory, wherein the ultrashort pulse laser outputs laser pulses that are then introduced into the material at various points along the feed trajectory. Frequently, the pulse frequency of the laser pulses is specified as fixed or is variable only to a limited extent, with the result that, if the movement speed varies, such as if there is a sudden change in direction in conjunction with movement systems exhibiting inertia, the spacing of the laser pulses along the feed trajectory in the material varies. In particular, it may be the case with such set-ups that laser pulses spatially overlap in the material to be processed in such a manner that the material is heated inhomogeneously, which can disadvantageously impact the material properties of the processed material and the processing process itself.

The use of high average powers of an ultrashort pulse laser consequently requires extended system technology that offers extended possibilities regarding the spacing of successive laser pulses on or in the workpiece.

SUMMARY

Embodiments of the present invention provide an apparatus for influencing a laser beam from an ultrashort pulse laser. The apparatus includes a pulse-precise deflector unit configured to deflect the laser beam in at least one direction perpendicular to a beam propagation direction, a transformation optics arrangement having at least two components arranged downstream of the pulse-precise deflector unit. The transformation optics arrangement is configured to transform a spatial deflection and/or an angular deflection of the laser beam into the angular deflection and/or the spatial deflection, and/or transform the spatial deflection and the angular deflection inversely, by using a space-to-angle transformation and/or an angle-to-space transformation. The apparatus further includes a processing optical unit arranged downstream of the transformation optics arrangement and configured to guide the laser beam into an image-side focal plane of the processing optical unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
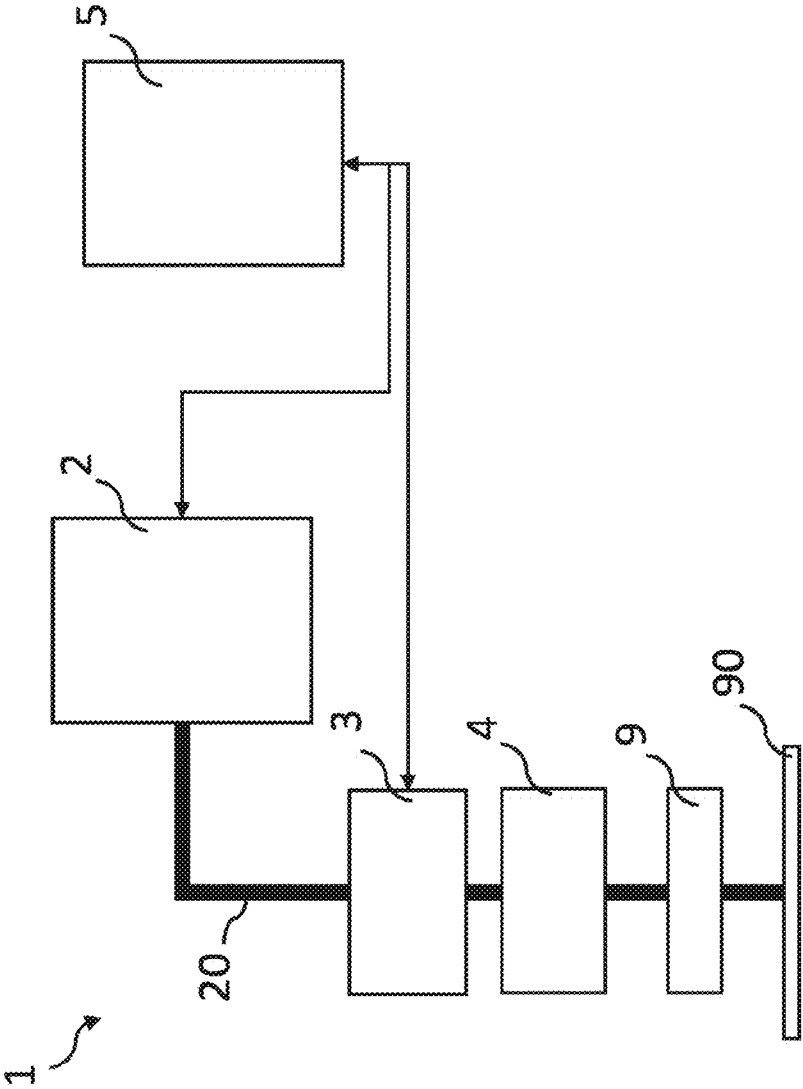
FIG. 1 shows a schematic set-up of the apparatus for beam-influencing a laser beam according to some embodiments.

Embodiments of the present invention provide an improved apparatus for beam-influencing a laser beam.

According to some embodiments, an apparatus for influencing a laser beam from an ultrashort pulse laser includes a pulse-precise deflector unit, which is configured to deflect the laser beam in at least one direction perpendicular to the beam propagation direction, wherein a transformation optics arrangement having at least two components which is arranged downstream of the pulse-precise deflector unit is configured to transform a spatial deflection and/or angular deflection of the laser beam into an angular deflection and/or a spatial deflection, and/or transform it/them inversely, by way of the pulse-precise deflector unit using a space-to-angle and/or an angle-to-space transformation, and a processing optical unit, which is arranged downstream of the transformation optics arrangement and is configured to guide the laser beam into the image-side focal plane of the processing optical unit.

The ultrashort pulse laser makes ultrashort laser pulses available. In this context, ultrashort may mean that the pulse length is for example between 500 picoseconds and 10 femtoseconds and in particular between 10 picoseconds and 100 femtoseconds. However, the laser can also provide bursts of ultrashort laser pulses, wherein each burst comprises the emission of a plurality of laser pulses at a temporal distance of less than 100 ns within a time period of less than 10 microseconds. A temporally shaped pulse which has a significant change in amplitude, for example of more than 50%, within a range of between 50 and 5000 femtoseconds is also considered to be an ultrashort laser pulse.

In the process, the ultrashort laser pulses move in the beam propagation direction along the laser beam formed thereby.

A pulse-precise deflector unit is configured to deflect the laser beam in at least one direction perpendicular to the beam propagation direction. A beam deflection can consist in the influencing of the propagation direction of the laser beam, wherein in particular the incident laser beam can be shifted parallel to its original propagation direction, that is to say a spatial parallel offset can be imposed on the laser beam. A beam deflection can, however, also consist in imposing an angle offset on the laser beam such that the propagation direction of the laser beam changes by an angle due to the beam-influencing.

A pulse-precise deflector unit here comprises one or more pulse-precise deflectors. A deflector is pulse-precise if it is possible to individually deflect each laser pulse of the ultrashort pulse laser. For this purpose, the work frequency of the pulse-precise deflector can be synchronized for example with a fundamental frequency of the laser in such a way that the work frequency of the pulse-precise deflector corresponds to at least the repetition frequency of the ultrashort pulse laser. The text below makes reference merely to deflectors, but a pulse-precise deflector or a pulse-precise deflector unit is meant in each instance.

A deflector can be, for example, a microelectronic mechanical element or an electro-optical deflector or an acousto-optic deflector. The mode of functioning of an acousto-optic deflector will be described in the following text.

In the case of an acousto-optic deflector, an AC voltage is used, for example, to generate at a piezo crystal in an optically adjoining material an acoustic wave that periodically modulates the refractive index of the optical material. Here, the wave can propagate through the optical material, for example as a propagating wave or as wave packets, or be in the form of a standing wave. Owing to the periodic modulation of the refractive index, a diffraction grating for an incident laser beam is realized here. In particular, the diffraction image that is obtained for the laser beam corresponds to the transformed grating function, for example and preferably the Fourier transformed grating function.

An incident laser beam is thus diffracted at the diffraction grating and consequently deflected at least in part at an angle $\alpha$ to its original beam propagation direction. In particular, the laser beam is deflected by the angle offset in a direction perpendicular to the original propagation direction of the laser beam. The grating constant of the diffraction grating and thus the angle $\alpha$ here depend, among other things, on the wavelength or the periodicity of the standing grating vibration or on the frequency of the AC voltage applied. For example, a large angle offset for the first order of diffraction is attained by an acoustic wave having a small wavelength.

A transformation optics arrangement is an optical set-up of a component system that comprises at least two components. In this case, a component can be an optical component with imaging properties in particular, for example with a focusing or collimating effect. These include, among other things, imaging or curved mirrors, beam-shaping elements, diffractive optical elements, lenses such as converging lenses or diverging lenses, Fresnel zone plates, and further free-form components.

A spatial and/or angular deflection is imposed in the front deflector plane on the laser beam as it passes through the deflector unit. The front deflector plane can lie within or outside of the outer mechanical configuration of the deflector, depending on the type of deflector. Accordingly, the front deflector plane does not necessarily coincide with the mechanical end of the deflector unit.

The first component of the transformation optics arrangement can be arranged at a first distance from the front deflector plane. For example, the front deflector plane can be situated in the object-side focal point of the first component or between the object-side focal point and the first component itself. The first component produces a transformation of the spatial and/or angular deflection of the front deflector plane into an angular and/or spatial deflection in the first transformation plane. In particular, a spatial deflection is transformed here into an angular deflection, or an angular deflection into a spatial deflection. In this way, part of the laser beam, for example a divergent part of the laser beam, can be separated off and filtered out of the beam path, for example, as is shown further below.

The second component can be arranged at a second distance from the first component, wherein the second component produces an inverse transformation or a substantially inverse transformation, in particular an inverse transformation from the first filtered transformation plane into the so-called corresponding deflector plane. The corresponding deflector plane is arranged here at a third distance from the last element of the transformation optics arrangement. For example, the corresponding deflector plane can be arranged between the last element and the image-side focal plane of the element or in the image-side focal plane itself. Since the second component produces an inverse transformation of the filtered transformation plane, a cleaned-up laser beam, which for example no longer contains any diverging beam components, is produced in the corresponding deflector plane.

Provided the above-described transformations are Fourier transforms, the transformation plane is also referred to herein as Fourier plane.

As described above, the transformation optics arrangement is arranged downstream of the deflector unit or provided separately therefrom. This ensures that the laser beam deflected in the deflector unit can be subjected to downstream beam-shaping. This is significant in particular because the deflector unit typically has only a small acceptance of position deviations and beam shape deviations and in particular angle deviations at its input in order to provide here precise beam-influencing and in particular beam deflection. Since the beam-shaping through the transformation optics arrangement is located downstream, it is accordingly possible to provide a stable input for the deflector unit and thus to attain a simple and stably reproducible behavior of the deflector unit.

A processing optical unit is provided downstream of the transformation optics arrangement and is configured to guide the deflected and transformed laser beam into the image-side focal plane of the processing optical unit. In this sense, the processing optical unit produces a concluding angle-to-space transformation. This has the result that all beam deflecting elements, i.e. the influence of the deflector unit, are transitioned into the processing plane in accordance with their desired effect. The processing optical unit can here in particular also be the second component of the transformation optics arrangement. However, the processing optical unit can preferably form a telescope having a preferably reducing effect with the final component in the transformation optics arrangement.

The corresponding planes described above are generally defined as the planes that are linked by an angle-to-space transformation and a subsequent inverse space-to-angle transformation (also referred to as inverse transformation), for example by way of a transformation optics arrangement. For example, in the case of the transformation optics arrangement, the front deflector plane upstream of the first component can be linked by this relationship to the corresponding deflector plane downstream of the second plane. This thus corresponds to imaging of the front deflector plane into the corresponding deflector plane.

The planes described above, such as the focal planes, the corresponding planes, and the transformation planes are, in the mathematical ideal case, planar surfaces which are oriented perpendicular to the beam propagation direction and, in particular, are not curved and only have a two-dimensional extent. However, in the practical implementation, the optical components lead to minor curvatures and distortions of these surfaces, with the result that these surfaces usually are at least locally curved.

In addition, due to the components used, the focal point also has a finite volume. Rather than a flat, two-dimensional focal plane, a curved focal volume can thus also result due to the components used since an image representation of the laser beam is still sufficiently sharp, as will be specified further below.

Overall, the orientation of this volume relative to the propagation direction of the laser beams is provided however to a good approximation by the orientation of the mathematical plane. Therefore, reference is always made to the plane below, although consideration is always also given to the accessible volume, even if this is not explicitly mentioned. The explanations made above for the remainder also relate to the focal planes, transformation planes, and processing planes used and to the respectively corresponding planes, wherein imaging-related image field curvatures are also included.

The above considerations result in specific positioning tolerances in particular for the positions of the components used. By way of example, a positioning tolerance may be up to 20%, with the result that a component that should be at a first distance of for example 10 cm from a reference point still enables a sufficiently sharp image even at 9 cm and 11 cm. Accordingly, the image representations are automatically sufficiently "sharp" if the components are all positioned within the positioning tolerance. Moreover, a "coincidence" of two planes or two points means that the associated volumes at least partially overlap. In substantially collimated beam regions, two components can in the extreme case also follow one another directly.

Moreover, the term "focus" can generally also be understood to mean a targeted intensity boost, with the laser energy converging in a "focal region." In particular, the term "focus" is therefore used below independently of the beam shape actually used and the methods for bringing about an intensity boost. The location of the intensity boost along the beam propagation direction can also be influenced by "focusing." By way of example, the intensity boost can be virtually punctiform and the focal region can have a Gaussian intensity cross section, as provided by a Gaussian laser beam. The intensity boost can also have a linear embodiment, with a Bessel-type focal region arising around the focal position, as may be provided by a non-diffractive beam. Moreover, other, more complex beam shapes are also possible, the focal position of which extends in three dimensions, for example a multispot profile made of Gaussian laser beams and/or non-Gaussian intensity distributions.

It is also possible to cascade a plurality of transformation optical units.

This means that a first corresponding plane of a first transformation optics arrangement can be the exit plane for a further transformation with a further transformation optics arrangement. In particular, the second corresponding plane corresponding to the first corresponding plane is then linked by a corresponding transformation. In other words, a plurality of transformation optics arrangements can also be arranged in series.

It is thus also possible to produce a plurality of corresponding planes by arranging transformation optics arrangements in series or cascading them. In this case, a corresponding plane can also be located upstream of a corresponding component part, for example a transformation optics arrangement or a deflector unit. These planes are referred to as rearward planes.

Beam-shaping can then take place for example upstream or downstream of the deflector unit. The deflector unit can then be used to deflect the different partial laser beams or to block or enable them, while the beam-shaping, or the shaping of the beam profile, is achieved in the downstream Fourier optics arrangement with the beam-shaping element.

The deflector unit can comprise a first deflector, wherein the laser beam is coupled into the input of the first deflector and the first deflector is configured to deflect the laser beam in a first direction perpendicular to the beam propagation direction and to thereby preferably impose upon the laser beam a first angle offset.

The deflector unit can additionally comprise a second deflector, wherein, after the laser beam has traveled through the first deflector, it is coupled into the input of the second deflector with the imposed-upon first angle offset and the second deflector is configured to deflect the laser beam in a second direction perpendicular to the beam propagation direction, which is preferably perpendicular to the first direction, and to thereby preferably impose upon the laser beam a second angle offset in addition to the first angle offset.

By combining two deflectors, for example deflections or parallel shifts of the laser beam in the x- and y-directions, that is to say in the x/y plane, can be brought about in this way. With this set-up it is in particular also possible for the first deflector to split the incident laser beam into a multiplicity of partial laser beams. The multiplicity of partial laser beams are then incident on the second deflector, in which each of the multiplicity of incident partial laser beams is split again for example perpendicular to the first splitting direction. This is how for example a matrix-type or rectangular multispot geometry of the resulting partial laser beams can be produced.

For example, the incident laser beam can be split by the first deflector into five partial laser beams, which have a first angle difference relative to one another along the x-direction. The five partial laser beams can then be split by the second deflector in each case into ten partial laser beams, for example, wherein the splitting of each partial laser beam takes place at an angle to the y-direction. The partial laser beams can in this way have for example a second angle difference relative to one another in the y-direction. In this way, it is possible to produce for example 50 partial laser beams during passage through the deflector unit, wherein the partial laser beams are arranged on a raster after an angle-to-space transformation.

The deflectors of the deflector unit can be acousto-optic deflectors, wherein at least one acousto-optic deflector comprises a phased array transducer and has a diffraction efficiency of over 75% preferably over a broad exit region, preferably of at least 0.05°.

A phased array transducer is an apparatus with which an acoustic wave can be achieved which is adapted in dependence on the deflection angle or the control frequency and is introduced into the optical material, with the result that a homogeneous diffraction grating is formed in a large volume portion of the optical material and thus an efficient diffraction grating can be provided. Owing to a phased array, the acoustic wave can additionally be adjusted in dependence on the frequency applied, which means that it is possible to very precisely approximate the Bragg angle at a wide variety of deflection angles. This can achieve a high diffraction efficiency of for example over 70% over a broad deflection region of for example 15 mrad (approximately 0.8°).

The diffraction efficiency of an acousto-optic deflector can be given for example by the proportion of the intensity in the first order of diffraction in comparison with the incident laser intensity. In particular, this can ensure that a high laser energy for processing processes is provided via the partial laser beams.

The focus diameter of the laser beam is the diameter of the laser beam in the processing plane. The acousto-optic deflector for example can have the abovementioned diffraction efficiency over a region of approximately 15 focus diameters. Accordingly, a multiplicity of partial laser beams with a high intensity can be provided by means of two combined acousto-optic deflectors in a region of approximately 15×15 focus diameters.

Downstream of the first deflector and upstream of the second deflector, the laser beam can be coupled into a polarization rotation device, which is configured to rotate the polarization of the laser beam.

Owing to the polarization rotation device, the polarization direction of the laser beam can be rotated into a preferred direction. For example, the laser beam can thus be prepared for a subsequent shaping or filtering. The polarization rotation device can be, in the simplest case, for example a lambda/2 plate.

The deflector unit can comprise a filter element, wherein the filter element is arranged between the first and the second deflector, and the filter element is preferably configured to filter out the zero order of diffraction of the first deflector, and/or wherein the filter element is arranged downstream of the second deflector and the filter element is preferably configured to filter out components of the beam, for example a zero order of diffraction of the deflector unit downstream of the second deflector, and/or wherein the deflector unit has a further transformation optics arrangement having two components, which is configured to transform a spatial deflection and/or angular deflection of the laser beam into an angular deflection and/or a spatial deflection, and/or transform it/them inversely, using a space-to-angle and/or an angle-to-space transformation, wherein the filter element is arranged in a transformation plane of the transformation optics arrangement and the filter element is preferably configured to filter out the zero order of diffraction.

In particular, imaging of the first deflector into the second deflector needs to be ensured here, wherein the filtering takes place in the angle-to-space transform of the first deflector.

The incident laser beam is diffracted in the deflector by the diffraction grating that is formed there. This also provides a zero order of diffraction, which passes through the deflector without deflection. Downstream of the deflector, the zero order of diffraction thus travels like the incident laser beam, or with a parallel offset. The higher and possibly even the negative orders of diffraction, for example the first order of diffraction or the second order of diffraction, are located around the zero order of diffraction. The first order of diffraction here has the angle offset $\alpha$ relative to the zero order of diffraction.

A filter element can then be arranged in the deflector unit, for example between the first and the second deflector, in order to filter out the zero order of diffraction. In this way, only the higher orders of diffraction, that is to say the orders of diffraction starting from the first order of diffraction, are guided into the second deflector. Accordingly, ultimately only the deflected beams—that is to say the higher orders of diffraction—can leave the deflector unit.

However, a filter element can also be arranged downstream of the second deflector, wherein in each case the zero order of diffraction of the partial laser beams and the zero order of diffraction of the original laser beam are filtered out.

Since the zero orders of diffraction are independent of the settings and the operation of the deflector, there is consequently also no control over these partial laser beams. Consequently, filtering can filter these non-controllable partial laser beams out or at least attenuate them.

In the deflector unit, a further transformation optics arrangement having two components that are arranged for example downstream of the second deflector can also be provided, wherein the filter element can then be arranged in a transformation plane of the transformation optics arrangement and can preferably be configured to filter out the zero order of diffraction. This further transformation optics arrangement is independent of the transformation optics arrangement of the apparatus and is assigned only to the deflector unit.

In the transformation plane, the image is split downstream of the second deflector according to its spatial frequencies, or linked by an angle-to-space transformation (for example a Fourier transform). In particular, as described above, the partial laser beams of the higher order of diffraction can be fanned out in accordance with a raster, while the zero orders of diffraction do not follow this periodicity. Consequently, the zero orders of diffraction are assigned in the transformation plane to a different location than the orders of diffraction that lie, for example, on a raster. It is possible using a filter element in the transformation plane to filter out the zero orders of diffraction, for example.

A filter element can also be for example a graduated filter, with the result that the different spatial frequency components for example in the transformation plane are attenuated to different extents. With this weighting of the different spatial frequency components, it is possible to influence the beam shape in the processing plane. A filter element can also be designed to be reflective and steer the transmitted or reflected component into a beam trap in a targeted manner.

A filter element can also be a polarization element, which imposes upon the laser beam preferably a locally variable polarization change. In this way, the stop function is encoded in a local polarization. The different components can then be filtered out of the laser beam by means of a polarization splitter. For example, a local s-polarization then corresponds to a complete transmission, and a local p-polarization corresponds to a vanishing transmission. The gradient functions can also be produced by means of intermediate states, for example by proportional p- and s-polarization, with which for example a local transmission of 50% is achieved at the polarization splitter.

In other words, the laser beam then leaves the deflector unit in a precise shape, and high-quality beam-shaping can be achieved in the subsequent transformation optics arrangement.

The transformation optics arrangement can be a Fourier optics arrangement, wherein the front deflector plane of the deflector unit is arranged in the object-side focal plane of the first component, the image-side focal plane of the first component coincides with the object-side focal plane of the second component, and the front deflector plane of the deflector unit is imaged in the image-side focal plane of the second component, and the laser beam is deflectable in the image-side focal plane of the second component in accordance with the deflection by the deflector unit.

A Fourier optics arrangement is an optical set-up of a component system in which the distances between the components, the distances of the components from the object to be imaged, and the distances of the components from the image plane into which the object is imaged have a special relationship. The Fourier optics arrangement can comprise here at least two components, wherein the components preferably have the same focal length. However, the components can also have different focal lengths if, for example, an enlarging or reducing effect is to be achieved with the component arrangement. Generally, the Fourier optics arrangement is used to carry out an angle-to-space transformation and subsequently a space-to-angle transformation.

As a whole, the above-stated positioning of the components relative to the deflector implements a so-called 4f optical unit, as a result of which it is possible to transition the front deflector plane, and thus the laser beam deflected by the deflector unit, in particular possible spatial and angular deviations of the laser beam, and the beam profile and the beam geometry into a corresponding deflector plane. The laser beam is deflected in the corresponding deflector plane in accordance with the deflection by the acousto-optic deflector unit.

In the transformation optics arrangement connected downstream of the deflector unit, preferably a beam-shaping element can be arranged in a corresponding deflector plane or in a transformation plane or in a corresponding transformation plane, wherein the beam-shaping element is configured to impose upon the laser beam a specified intensity distribution and/or phase distribution and/or polarization distribution.

A beam-shaping element is understood to mean an apparatus that is configured to influence an incident laser beam in two spatial dimensions in terms of one or more properties, wherein it is configured in particular to influence a lateral phase distribution, a polarization distribution, an intensity or amplitude distribution and/or a propagation direction of the laser beam. Influencing of the propagation direction can preferably likewise be the indirect result from the influencing in particular of the phase distribution.

If the beam-shaping or beam-shaping unit is arranged upstream of the deflector unit, it is advantageous if the input angle distribution that is provided by the beam-shaping unit of the deflector unit is as small as possible, so that an angle-dependent diffraction efficiency of the deflector is negligible or able to be compensated. In addition, the entrance aperture of the deflector unit, which may be for example 2 mm to 20 mm, should not represent any limitation of the beam shape either.

For example, a non-diffractive beam, for example a Bessel-Gaussian beam, whose intensity distribution in the far field is for example a ring-shaped intensity distribution which is guided through the deflector unit, can be produced upstream of the deflector unit. Around the downstream transformation planes, the non-diffractive beams are then formed and can be repositioned quickly using the deflector unit.

For this reason, beam-shaping units upstream of the deflector unit are in particular suitable for influencing the beam profile. For example, a flat-top beam profile can be prepared from a Gaussian laser beam, wherein the deflection of the modified beam then takes place in the deflector unit. In addition, the deflector unit or a downstream beam-shaping can be used for splitting the beam into partial laser beams and/or shaping it. Every partial laser beam can thus subsequently have for example a flat-top beam profile.

Beam shapes with high accuracy requirements, for example in relation to the propagation direction or beam profile, can benefit from additional shaping or filtering of the corresponding transformation plane. For example, specific spatial frequencies can be attenuated by a corresponding filter element in the corresponding transformation plane, so that for example the contrast in the processing plane increases. For example, it is thus also possible to compensate the angle dependence of the deflection.

By way of example, the beam-shaping element can be in the form of a diffractive optical element (DOE), a free-form surface or an axicon or a micro-axicon, or may contain a combination of a plurality of these components or functionalities.

A diffractive optical element is configured to influence one or more properties of the incident laser beam in two spatial dimensions. A diffractive optical element is a fixed component part which can be used to produce precisely one beam shape from the incident laser beam. Typically, a diffractive optical element is a specifically formed diffraction grating, wherein the laser beam is brought into the desired beam shape by the diffraction.

In a further preferred configuration, a beam splitting unit is provided, preferably a diffractive beam splitting unit, which is arranged in a corresponding deflector plane or in a transformation plane or in a corresponding transformation plane and is configured to adapt the angle offset of the acousto-optic deflector unit.

Since the acousto-optic deflector is limited in terms of its diffraction efficiency, the laser beam can be effectively deflected only over a specific angle region.

Preferably, a beam deflection unit, preferably a galvanometer scanner, can be arranged in a corresponding acousto-optic deflector plane or in a transformation plane or in a corresponding transformation plane and be configured to deflect the laser beam.

A beam deflection unit can here be configured to deflect the laser beam from its beam direction. In particular, a beam deflection is given by a parallel offset or an angle offset of the transmitted laser beam relative to the original laser beam. This makes it possible to reposition the laser beam.

A galvanometer scanner is here a component part, wherein the laser beam can be positioned with high accuracy and repeatability using a rotary mirror. In particular, a one-dimensional galvanometer scanner deflects the laser beam in only one direction, while a two-dimensional galvanometer scanner deflects the laser beam in two different directions, which are preferably orthogonal in relation to one another.

In a further preferred configuration, a scanner, preferably a piezoelectric scanner, is configured to move the beam-shaping element and/or the beam splitting unit and/or the beam deflection unit perpendicular to the beam propagation direction, wherein the beam deflection of the acousto-optic deflector unit and the movement of the scanner are synchronously matched to each other.

In particular, this can be advantageous if a continuous, scanning movement of the laser beam in the processing plane is to take place. It is thus possible to manipulate the points of incidence of the laser beam in the processing plane via the deflection using the acousto-optic deflector unit, while, with tracking of the beam-shaping element, the beam shape of the laser beam introduced into the processing plane is always the same.

A piezo shifter is here an electronic component part that changes its thickness when a DC voltage is applied. Consequently, it is possible by applying a voltage to shift a filter element which is mounted thereon for this purpose.

A beam clean-up element, preferably a stop, can be arranged in a corresponding processing plane.

A stop or a mask are component parts that block specific beam components and thus influence the amplitude distribution of the laser beam. For example, a stop, in particular an iris diaphragm, can block beam components remote from the beam center, while a mask can have a more complex shape so as to be able to filter out more specific beam components.

A rasterized beam-shaping element can be arranged in a corresponding processing plane, wherein preferably each raster element is an individual beam-shaping partial element.

A rasterized beam-shaping element has in particular a spatial division, for example a two-dimensional division. Each element of this spatial division is here also referred to as raster element.

The rasterized beam-shaping element can for example be a graduated filter and have a checkerboard profile or be a spatial light modulator.

A spatial light modulator can be, for example, a nano grating or a hybrid element, which can impose a defined phase distribution on the laser beam by way of its inherent structure or configuration. However, a light modulator can also be for example a spatial light modulator whose cells or pixels influence the laser beam by way of settable birefringent properties.

Rasterized beam-shaping elements are advantageous if the beam properties of the laser beam change due to the selection of the raster element through which the laser beam is to be transmitted. For example, one raster element can correspond to a Gaussian beam profile, while another raster element corresponds to a flat-top beam profile. In particular, in a way a tool change in laser processing processes is thus possible due to a rasterized beam-shaping element.

It is also possible by means of raster elements to cover a relatively large scanning region with high spatial resolution on the workpiece. For this purpose, the limited deflection region of the deflector (for example 15 mrad) is used by means of a transformation optics arrangement having a long focal length. The combination with a processing optical unit having a short focal length thus brings about a reduced effect of the raster element or the beam shape produced by the raster element on the workpiece.

Consequently, a large region on the raster element can be addressed, and the local structure can be implemented on the workpiece in a highly reduced manner or with high angle components.

In particular, it is possible here to produce a non-diffractive beam from a diffractive beam, for example Gaussian beam. Non-diffractive beams are beams which are generally known as Bessel beams, or the practical implementation thereof. Non-diffractive beams have a large focal position tolerance here, since the beam profile in the propagation direction is significantly elongated in comparison with the lateral extent in the plane perpendicular to the propagation direction.

Due to the use of these elements, the case may arise that the image representation is deliberately produced to deviate from the mathematically ideal Fourier optics arrangement. If the element, such as for example a micro-axicon array, is located in the image-side focal plane of a preceding optical unit, the object-side focal plane of the subsequent optical unit can be shifted deliberately. Consequently, it is not located in the segmented element but in the intermediate focus produced by the segmented element. The subsequent optical units transfer this intermediate focus, as before, into the processing plane. The position deviation of the optical unit following the segmented element can in this case also be more than the previously mentioned 20%.

A control device for controlling the deflector unit may be provided, with the control device being configured to bring about the deflection of the incident laser beams in such a way that each pulse of the laser beam is incident on a different raster element of the rasterized beam-shaping element or the laser beam is directed to a specific raster element or the laser beam sweeps over a plurality of raster elements, or a plurality of partial laser beams are guided in a targeted manner to a plurality of raster elements.

For this purpose, the control apparatus of the deflector unit can provide control signals. In particular, it is possible by way of the period or the frequency of the control signal of the control apparatus to define the grating constant of the optical grating of the acousto-optic deflector in such a way that the diffraction angle of the laser beam is determined via the grating constant of the optical grating. The control signal can be changed by the control apparatus such that the manner and the extent of the beam influencing can be controlled by the control apparatus.

The extent of the formation of the diffraction grating in the optical material of the acousto-optic deflector can be adjusted via the amplitude.

In particular, it is possible hereby to realize a quick beam deflection, wherein the laser beam can be positioned freely in the work field of the deflector unit at a rate of up to 1 MHz or 10 MHz or 100 MHz. Typically, a corresponding control apparatus is therefore based on an FPGA (Field Programmable Gate Array) with fast linked memories, wherein processing parameters such as beam geometry, beam profile and beam deflection are able to be stored for a specific processing operation or process.

The control signal can in particular be made up of a plurality of periodic, electronic signals having different frequencies. Due to the different frequency components of the signal, the optical grating that is produced thereby by the acousto-optic deflector unit also has different or overlaid grating constants. The different grating constants consequently lead to a multiplicity of possible orders of diffraction.

In particular, the incident laser beam is split thereby into a plurality of partial laser beams, wherein the angle offset of the partial laser beams is ultimately given by the frequency components of the control signal. Consequently, a multispot geometry can be produced accordingly with the deflector unit.

The control signal for the deflector unit can additionally also be an arbitrary signal, wherein an arbitrary signal can be made up of a multiplicity of signals and/or the frequency is varied over time. Hereby, complex diffraction gratings are produced, which can in particular also influence the beam profile of the laser beam or of the partial laser beams.

Since the diffraction image corresponds to for example the Fourier transform of the grating function, image errors produced, or expected, by the preceding or the further passage of the laser beam through optical components, such as for example astigmatism and aberrations, can be largely compensated for using correspondingly selected diffraction gratings.

It is furthermore possible by way of arbitrary signals to continuously or abruptly influence the beam deflection such that a continuous movement of the deflected laser beam or an abrupt but precise positioning of the laser beam is made possible. For example, an arbitrary signal with increasing frequency, that is to say a wavelength of the acoustic wave in the deflector unit that is becoming shorter, can bring about increased deflection of the laser beam. For example, an abrupt change of the excitation frequency can lead to a jump, for example a repositioning, of the laser beam.

By using arbitrary signals as control signals, it is thus possible to superpose upon the laser beam a multiplicity of different beam profiles and variations thereof. For example, it is thus also possible to produce a multispot geometry, wherein the partial laser beams of the multispot geometry are directed at specific mask positions. In particular, it is possible to define for each pulse of the ultrashort pulse laser a specific raster element that is intended to influence the respective pulse.

In a further embodiment, a processing optical unit is provided downstream of the transformation optics arrangement and is configured to guide the laser beam through the beam-shaping element and/or the beam splitting unit and/or the beam deflection unit into the image-side focal plane of the processing optical unit, wherein the processing optical unit preferably has, together with the last element in the transformation optics arrangement, a reducing effect, with particular preference is designed with a large numerical aperture and a short focal length and/or is in the form of a transmissive or reflective optical unit.

The numerical aperture NA describes the ability of an optical element to focus light. In this respect, the numerical aperture results from the opening angle of the objective and the refractive index of the material between the objective and the focal spot. A maximum numerical aperture is achieved when the opening angle between the marginal ray and the optical axis is 90°. The maximum resolution, or the minimum structure size, that can be imaged by the objective is then directly proportional to the wavelength of the laser light divided by the numerical aperture.

A high NA objective is accordingly an objective which has a high numerical aperture, that is to say a large opening angle. This makes it possible to introduce microstructures into the material with high resolution using a high NA objective. For example, the numerical aperture can be greater than 0.1, in particular greater than 0.2.

However, it may also be the case that the objective is not a high NA objective. In particular, optical units having both a long focal length and also a short focal length can be used.

A transmissive optical unit refers to an optical system, wherein the light is influenced as it passes through an optical medium. For example, a lens is a transmissive optical unit. However, the optical unit can also be in the form of a reflective optical unit. Reflective optical units influence the beam propagation without the light needing to propagate through an optical medium. The influencing is implemented in particular by way of a mirror system. For example, a telescope mirror is a reflective optical unit. In particular, a Schwarzschild objective is also a reflective optical unit.

The processing optical unit forms a final angle-to-space transformation, as a result of which the processing plane corresponds to a transformation plane. This has the result that all beam-shaping, beam-splitting or beam-deflecting elements are transitioned into the processing plane in accordance with their desired effect.

Preferably, a feed apparatus is provided, which is configured to pick up a material to be processed, arrange it in the image-side focal plane of the processing optical unit and move the material relative to the laser beam, as a result of which the laser beam is guided over the material.

The feed apparatus can have a securing apparatus, for example, on which the material can be fixed. Fixing can be realized by adhesive bonding or clamping, for example. However, fixing can also function by way of a negative pressure by means of a suction apparatus. In particular, the feed apparatus can be movable in at least two spatial axes. The feed apparatus typically includes a further translation axis, in particular in curved or tilted workpiece surfaces further rotation or tilt elements are used for positioning the laser beam relative to the workpiece. For example, the feed apparatus can therefore also be an XY stage or an XYZ stage.

Furthermore, a feed apparatus can be moved or shifted in an automated manner, or in a motorized manner with a feed motion. In this case, the feed motion is a movement at a feed rate, wherein the feed motion takes place along a feed trajectory.

By virtue of the feed apparatus moving the material relative to the laser beam, the laser beam is guided over the material along the feed trajectory, as a result of which it is possible to process the material at the locations of the feed trajectory and possibly also to control the work angle of the laser radiation relative to the workpiece.

By virtue of the material being arranged in the image-side focal plane of the processing optical unit, it is possible to guide the laser beam guided through the beam-shaping element onto or into the material. In this way, the laser energy is introduced into the material in accordance with the imposed beam shape, as a result of which for example the material heats up or transitions directly into a plasma state. This may result in a modification of the material and for example in the case of a glass in a modification of the glass network structure. If the light introduction is sufficiently high, such energy deposition can, however, also result in ablation and thus be used in a drilling process, for example in a percussion drilling process.

The feed apparatus can here be connected to a control apparatus for exchanging control signals, and the control apparatus can be configured to adapt the position of the feed apparatus in relation to the control of the acousto-optic deflector unit. The control apparatus is the control apparatus that also controls the acousto-optic deflector unit or it is connected thereto at least for the exchange of data.

In this way, the position of the laser beam can be adapted in accordance with the control of the acousto-optic deflector unit. For example, during a slow translation by way of the feed apparatus, it is possible to introduce in a first region a first beam shape, while, after some time, the first region transitions into the second region and a second beam shape is to be introduced there. By coupling the feed apparatus and the acousto-optic deflector unit to the control apparatus, system-wide coordination of the material processing is possible.

Owing to the connection of the feed apparatus and the acousto-optic deflector unit, the control apparatus can compensate for, or equalize, the beam offset between two pulses in the focal plane of the processing optical unit with the feed apparatus or the acousto-optic deflector unit.

For example, the spatial distance of the introduction of successive laser pulses which are output with a fixed temporal distance can change due to a varying feed rate along the feed trajectory. Such a varying feed rate occurs in feed or deflection units that are subject to inertia in particular in the case of direction changes, for example in curves or corners of the feed trajectory. In these regions it may therefore be sensible to compensate for the changes in speed of the feed apparatus by correspondingly controlling the acousto-optic deflector unit.

In a further configuration, the feed apparatus has at least one axis encoder, wherein the control apparatus is configured to read the axis encoder position, and the laser is configured to specify for the control apparatus the fundamental frequency for the controlling clock for deflecting the laser beam by way of the acousto-optic deflector unit and for reading the axis encoder position, wherein the control apparatus is configured to calculate in real time from the current axis encoder position a position error for the subsequent pulse, wherein the control apparatus corrects the position error by adapting the control signal of the acousto-optic deflector unit.

If the feed apparatus is moved, the instantaneous spatial position can be processed in the control apparatus via the read axis encoder positions. Since the fundamental frequency of the laser provides the clock and thus a common time base, the feed, the pulse emission, and the beam deflection can be coordinated or synchronized via the control apparatus.

By supplying the axis encoder positions from the feed apparatus back to the control apparatus, a position error for the subsequent pulse can be calculated in real time. This error can then be compensated for using the acousto-optic deflector unit, provided the error lies within the processing region that is accessible to the acousto-optic deflector unit. This requires neither a complex model nor large amounts of memory.

In particular, it is possible hereby to counteract the decrease in the repetition frequency of the pulses in the case of a slow feed. Consequently, the maintenance of the repetition frequency of the laser has a positive effect on its energy stability.

It should be highlighted that in particular the combination of beam-shaping and beam-influencing by means of the acousto-optic deflector unit is of particular advantage because the effect of the individual pulses can be improved by the beam-influencing. Consequently, the advantages of the exact beam positioning can also be utilized without a reduction in the repetition frequency.

Preferred exemplary embodiments are described below with reference to the figures. In this case, elements that are the same, similar or have the same effect are provided with identical reference designations in the different figures, and a repeated description of these elements is omitted in some instances, in order to avoid redundancies.

FIG. 1 schematically shows an apparatus 1 for beam-influencing a laser beam 20. A schematically illustrated ultrashort pulse laser 2 is provided here for generating a laser beam 20.

The laser beam 20 is guided through a deflector unit 3 in which the laser beam 20 is deflected. For this purpose, the deflector unit 3 is connected to a control apparatus 5, wherein the control apparatus 5 can transmit electronic control signals to the deflector unit 3.

Controlled by the electronic control signals, the laser beam 20 is advantageously deflected. For example, the deflector unit 3 can comprise acousto-optic deflectors. In acousto-optic deflectors, acoustic waves which result in modulation of the refractive index of the optical material are generated in the optical material of the deflector unit 3 by way of the electronic control signals. Due to the modulation of the refractive index, optical gratings are produced at which a laser beam 20 that is passing through can be diffracted. The resulting diffraction pattern is here specific to the respective configuration of the acoustic wave. It is possible hereby to influence the diffraction pattern via the acoustic waves.

The laser beam 20 deflected by the deflector unit 3 is subsequently guided through a transformation optics arrangement 4, in which filtering, shaping, beam manipulation and other beam processing can take place, and a processing optical unit 9 into a focal plane 90, wherein the laser beam 20 in the focal plane 90 is influenced in accordance with the deflection by way of the deflector unit 3 and, in particular, is deflected or repositioned in relation to the angle.

Figure 2A:
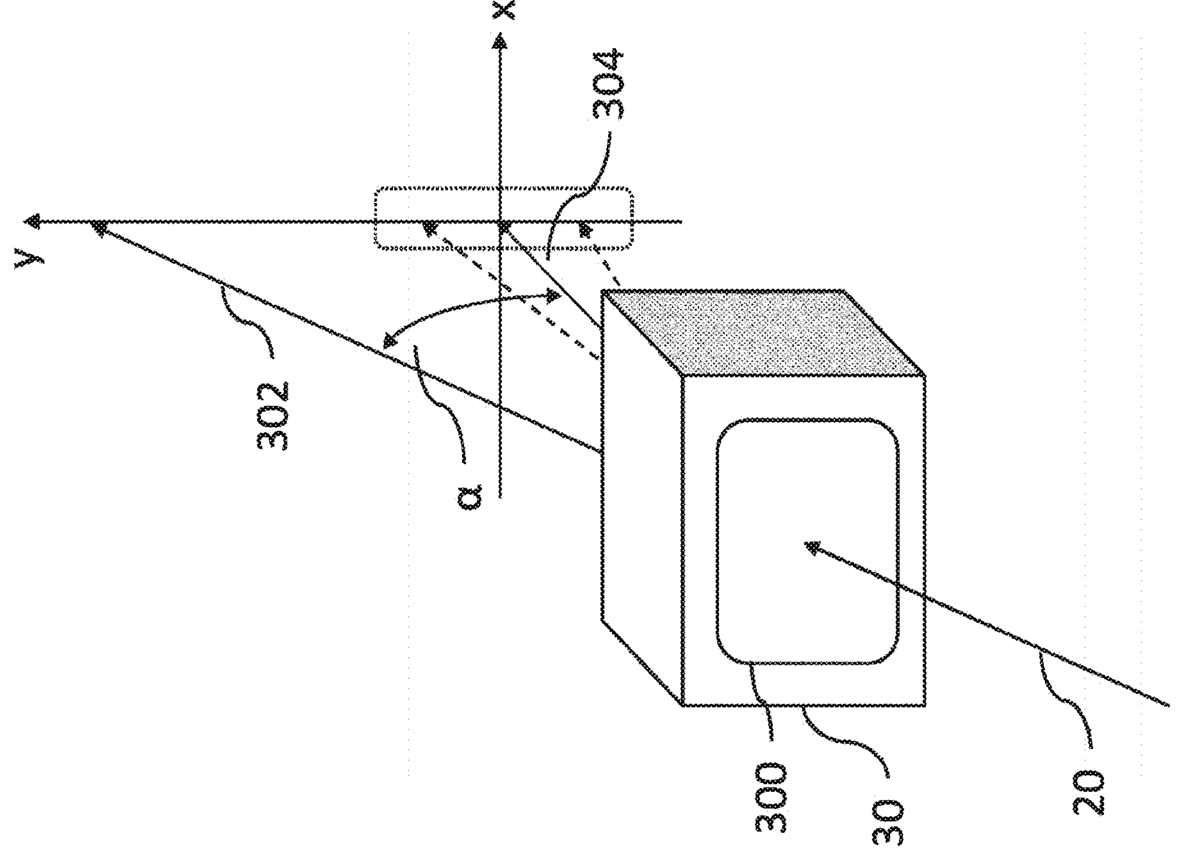
FIGS. 2A and 2B show a schematic illustration of the beam influencing by way of an acousto-optic deflector and an acousto-optic deflector unit according to some embodiments.

FIG. 2A shows by way of example an acousto-optic deflector 30 of the deflector unit 3. The laser beam 20 is coupled here into the input of the acousto-optic deflector 30. Coupling in this case means a simple transmission through an entrance opening 300 of the acousto-optic deflector 30.

The laser beam 20 is transmitted in part without deflection by the refractive index modulation through the acousto-optic deflector 30. The non-deflected beam component is referred to as the zero order of diffraction 302 of the acousto-optic deflector 30. In addition, there is also at least the first order of diffraction 304 of the acousto-optic deflector 30. The first order of diffraction 304 encloses with the zero order of diffraction 302 the angle $\alpha$. The angle $\alpha$ is controllable here through the electronic control signals from the control apparatus 5 and consequently via the acoustic wave structure produced in the acousto-optic deflector 30. For example, the angle $\alpha$ can be decreased or increased. This is illustrated in the figure by the dashed arrows behind the acousto-optic deflector 30, wherein the box bounded by the dotted line shows the maximum deflection region attainable through the acousto-optic deflector 30. Taking into account the parameters of the laser beam 20, the acousto-optic deflector 30 is designed and oriented relative to the laser beam 20 such that, for the desired angle range a of the first order of diffraction 304, a combination that is optimal for the application of maximum diffraction efficiency and minimum beam deformation takes place.

The acousto-optic deflector 30 can furthermore comprise a phased array transducer, as a result of which a diffraction efficiency of over 5% to over 90% across a broad deflection region can be attained while at the same time the beam deformation is negligible. The deflection region can here, with reference to the opening angle of the laser beam 20, encompass 15 times the angle and correspondingly have a region of approximately 15 focus diameters of the deflected laser beam 20 after an angle-to-space transformation.

The acousto-optic deflector 30 brings about a beam deflection along the y-axis. In order to bring about beam deflection in the x-direction, the acousto-optic deflector 30 can be rotated for example by 90°.

Figure 2B:
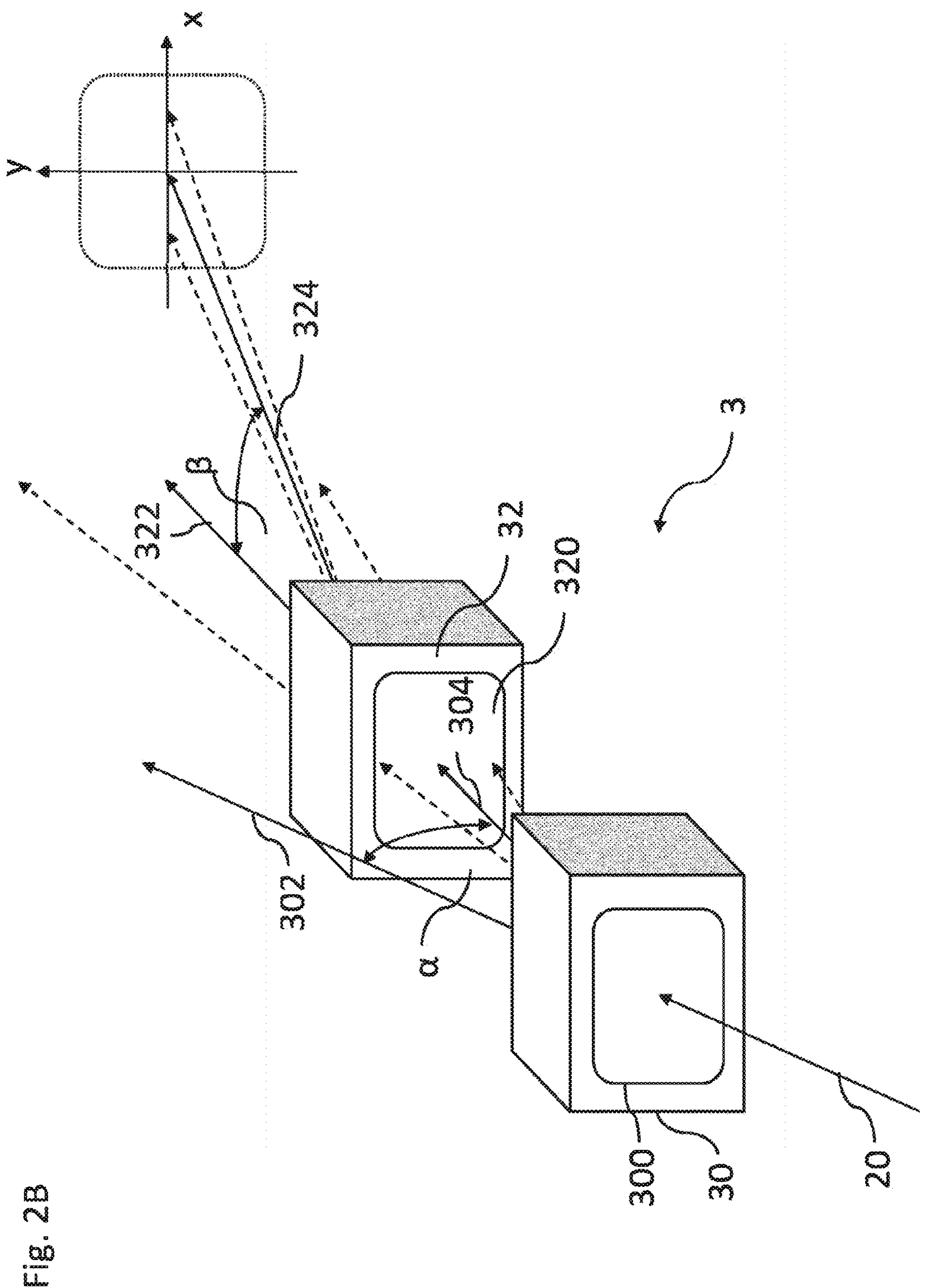

FIG. 2B shows a combination of two acousto-optic deflectors 30, 32 forming a deflector unit 3. The first acousto-optic deflector 30 here produces, as in FIG. 2A, a beam deflection in the y-direction. The first order of diffraction 304 of the first acousto-optic deflector 30 is then incident on the entrance opening 320 of the second acousto-optic deflector 32. The sound propagation direction of the second acousto-optic deflector 32 in this example is rotated by virtually 90° in relation to that of the first acousto-optic deflector 30 such that the deflection by the second acousto-optic deflector 32 takes place in the y-direction. Furthermore, the sound propagation direction of the second acousto-optic deflector 32 relative to the beams of the first order of diffraction 304 which are deflected by the acousto-optic deflector 30 is aligned such that a high diffraction efficiency and low beam deformation of the first order of diffraction 324 by the angle β are attainable. In this case, the angle β relates to the angle relative to the zero order of diffraction 322 of the second deflector 32, which is formed by the non-diffracted beam components from the first order of diffraction 304 of the first deflector 30. Accordingly, the first order of diffraction 324 of the second acousto-optic deflector 32 has a total angle offset a relative to the incident laser beam in the y-direction and an angle offset β relative to the incident laser beam 20 in the x-direction. Consequently, the deflections of the laser beam perpendicular to the original beam propagation direction are thus influenced independently of one another via the two acousto-optic deflectors 30, 32.

As an alternative to a rotation of the sound field direction of the acousto-optic deflectors 30 and 32, an image rotation about 90° can also take place between the acousto-optic deflectors. For example, the deflection by way of the first acousto-optic deflector can also take place in the x-direction at the angle α, and the y-direction can be transformed by means of image rotation before this first order of diffraction 304 of the first acousto-optic deflector 30 is coupled into the second acousto-optic deflector 32 in order to provide a first order of diffraction 324 with the angle α in the x-direction.

Frequently, acousto-optic deflectors have a diffraction efficiency that is dependent on the input polarization. In this case, it is advantageous to adapt the input polarization of the beams 20 and 304, respectively, which have been coupled in, in each case to the sound field direction of the acousto-optic deflectors 30 and 32.

In an embodiment according to FIG. 2B, a rotation of the polarization between the two acousto-optic deflectors 30 and 32 is thus favorable, for example by means of a polarization rotator or a half-wave retardation element that is oriented at 45° to the polarization. In an embodiment with image rotation, the image rotation preferably takes place without polarization rotation.

In particular, the acousto-optic deflectors 30 and 32 in FIGS. 2A, 2B can also be used to produce a multiplicity of partial laser beams 200, which can be illustrated in particular by the dashed arrows. Accordingly, it is possible to produce with the first acousto-optic deflector 30 for example three partial laser beams, while these three partial laser beams are subsequently split again via the second acousto-optic deflector 32 into three partial laser beams each, with the result that a total of nine partial laser beams are produced (cf. FIG. 4B).

Figure 3A:
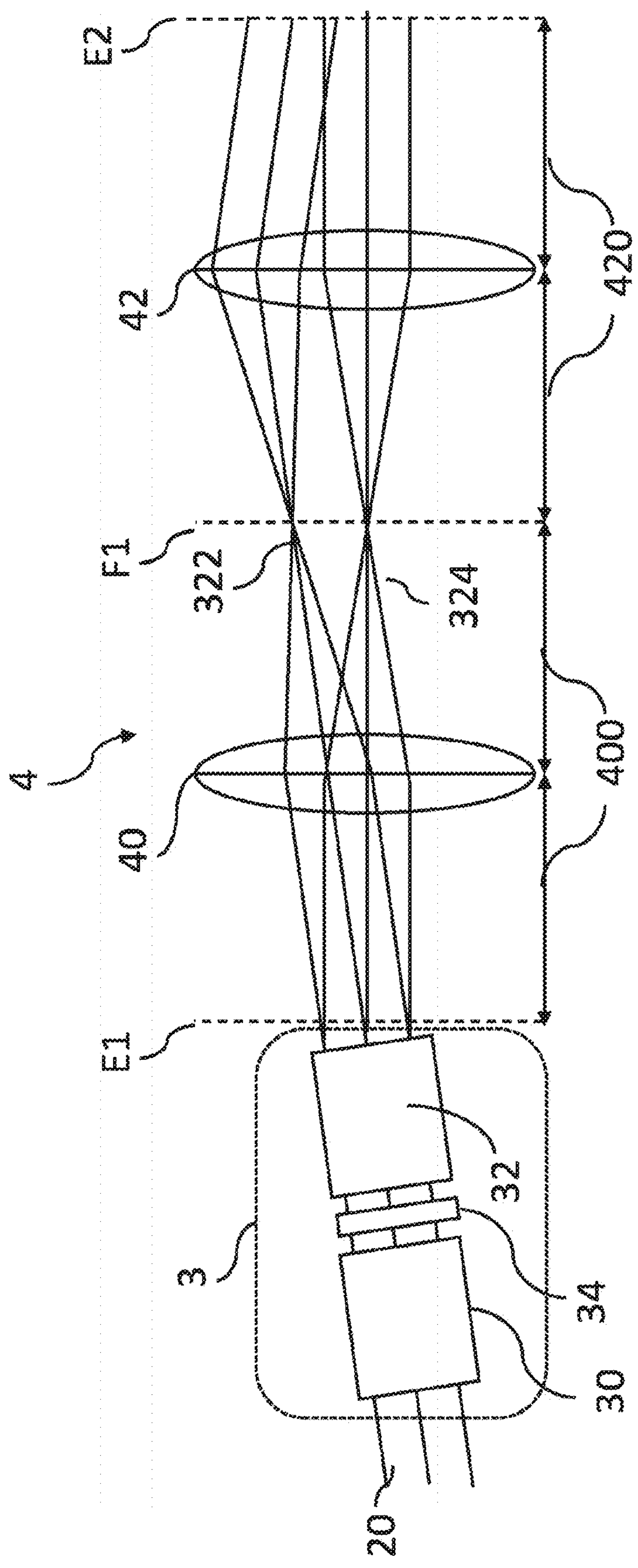
FIGS. 3A and 3B show a schematic illustration of the Fourier optics arrangement according to some embodiments.

FIG. 3A schematically shows a transformation optics arrangement 4 comprising a first component 40 and a second component 42. The first component 40 has a first focal length 400, while the second component 42 has a second focal length 420. Both focal lengths 400, 420 are preferably of equal size. The image-side focal plane of the transformation optics arrangement 4 is also referred to as the corresponding deflector plane E2.

The front deflector plane E1 is located in the object-side focal plane of the first component 40. The image-side focal plane of the first component 40 coincides with the object-side focal plane of the second component 42, meaning that the transformation optics arrangement 4 is a Fourier optics arrangement. Accordingly, the distance between the first component 40 and the second component 42 is the sum of the two focal lengths 400, 420. The plane in which the two focal planes coincide is what is known as the transformation plane F1. In the transformation plane F1, the object, that is to say the influenced laser beam 20, is split in accordance with its spatial frequencies by the deflector unit 3. As a result of this, filtering and further beam-shaping of the beams can take place in the transformation plane F1.

In other words, the transformation optics arrangement 4 is arranged downstream of the deflector unit 3. Using the transformation optics arrangement 4 that is arranged downstream, beam-shaping of the laser beam that was deflected by the deflector unit 3 and ultimately conditioned by filtering the zero order of diffraction can be achieved. Typically, shaping of the transverse beam profile, for example a rectangle or ring focus, by way of a beam-shaping element 6, for example a DOE, can take place in the plane E2.

FIG. 3A shows the splitting of the beams upstream of the component 40 in a large fashion to illustrate an embodiment of the invention. However, in experimental practice, the beams of the zero order of diffraction and the first order of diffraction travel virtually parallel to one another, so that the two orders of diffraction cannot be separated until the splitting into the spatial frequencies in the transformation plane F1.

The deflector unit 3 can itself optionally have a filter element 34. For example, the filter element 34, as is schematically indicated in the figure, can be mounted downstream of the first deflector 30, and so for example the zero order of diffraction is filtered out between the first and second deflectors. In particular, the filter element 34 in the illustration shown also comprises optical components in order to image the deflector 30 into the deflector 32 and thus enable the filtering. For example, such filtering can be implemented by an iris diaphragm. In particular, the entrance opening of the deflector can also serve as a stop, if the splitting of the zero and first orders of diffraction of the first deflector 30 produces a larger spatial offset at the entrance opening 320 than can be coupled in through the entrance opening, as is already shown schematically in FIG. 2B.

However, a filter element 34 can also be mounted downstream of the second acousto-optic deflector 32, preferably in the transformation plane F1. In this case, too, the filter element 34 can be for example an iris diaphragm and filter different orders of diffraction or fanned-out partial laser beams out of the beam path. Alternatively, the filter functionality can be integrated in a beam influencing component arranged in the region of the transformation plane F1.

Figure 3B:
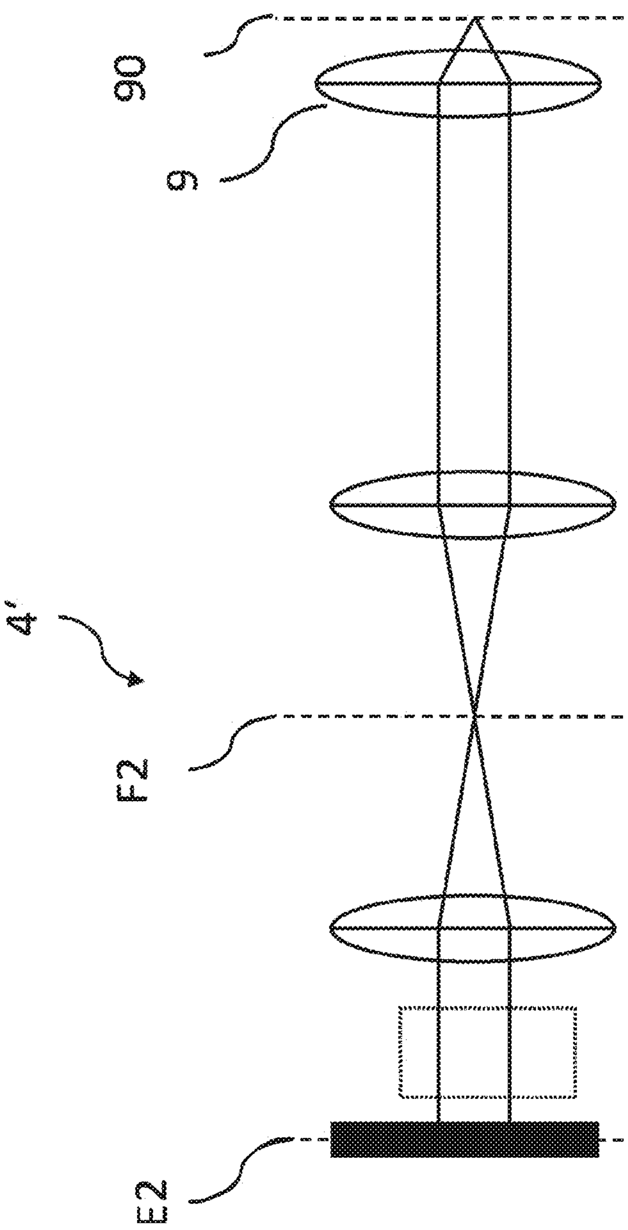

In FIG. 3B, the corresponding deflector plane E2 is transitioned into the image-side focal plane 90 using a cascaded second transformation optics arrangement 4' and a processing optical unit 9.

The processing optical unit 9 can be, for example, a telescope or form a telescope with the final component in the transformation optics arrangement and thus in particular comprise a plurality of lenses or mirrors. For example, the telescope can have a reducing effect, with the result that the beam shape indicated in the deflector plane is introduced in a reduced manner in the processing plane. In particular, an objective with a large numerical aperture can be used herefor, wherein the large numerical aperture is representative of a large opening angle of the objective. This opening angle in FIG. 3B is schematically illustrated by the obtuse angle downstream of the processing optical unit 9.

Figure 4A:
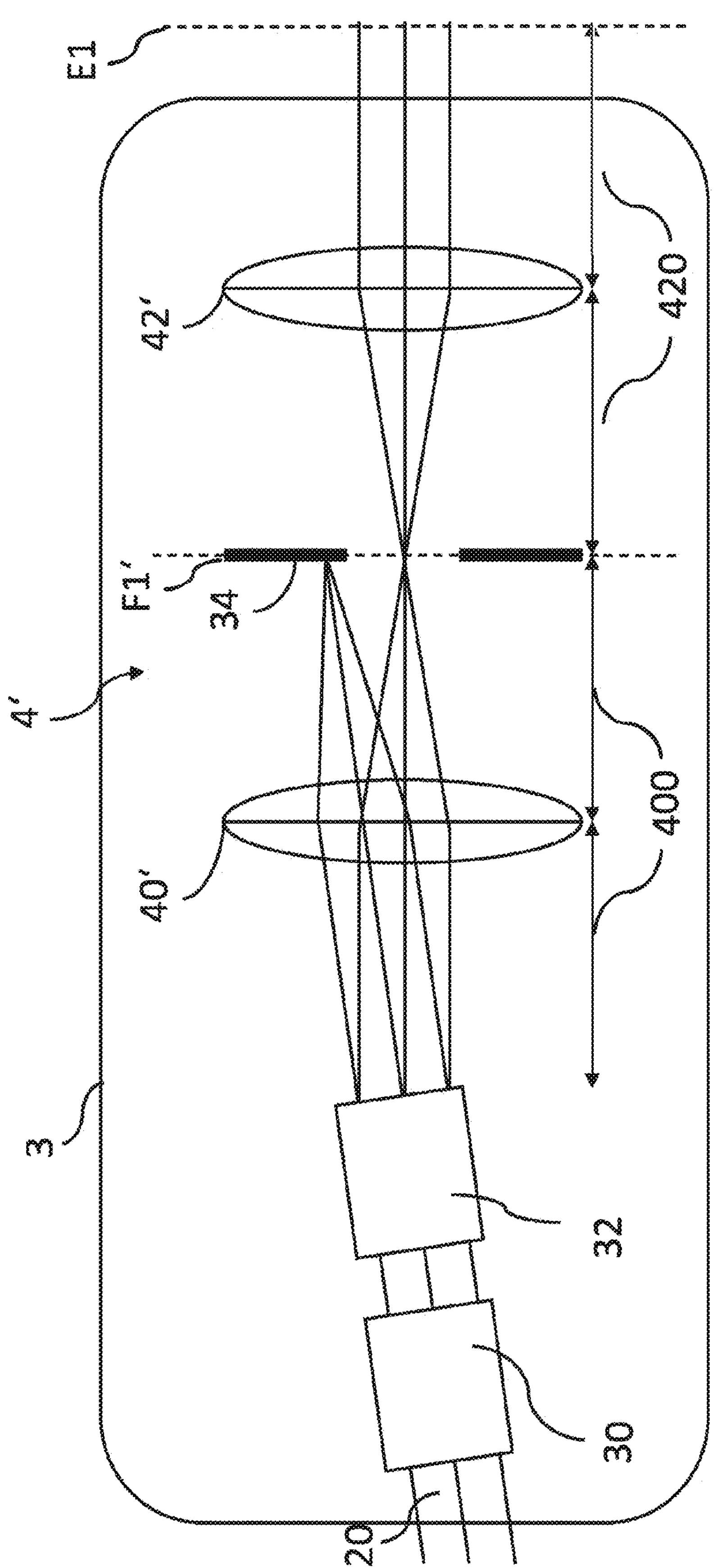
FIGS. 4A and 4B show one possibility for implementing filtering, and a filter element according to some embodiments.

FIG. 4A shows a further possibility for implementing filtering. In this case, the deflector unit 3 itself has a further transformation optics arrangement 4'. In particular, the transformation optics arrangement 4' can also be a Fourier optics arrangement. The transformation optics arrangement 4' can here be mounted in addition to the transformation optics arrangement 4 shown in FIG. 3, wherein the further transformation optics arrangement 4' is arranged downstream of the second deflector 32 and in particular, in the beam direction, upstream of the front deflector plane 1. The transformation optics arrangement 4' of the deflector unit 3 can decompose the beam splitting due to the combined deflectors 30, 32 into their spatial frequency components and guide them to the transformation plane F1'.

In the transformation plane F1', the spatial frequency components of the laser beam can be filtered using a filter element 34 and weighted. Such a filter element 34 can filter out for example specific spatial frequency components, or attenuate them, so that for example focusing or contrast enhancement of the image is achieved in the processing plane.

Through the imaging of the second component 42' of the filtered transformation plane F1', the spatial frequencies are recomposed to form an image which corresponds to the filtered variant of the image at the exit of the second acousto-optic deflector 32. This image is then provided in the front deflector plane E1.

Figure 4B:
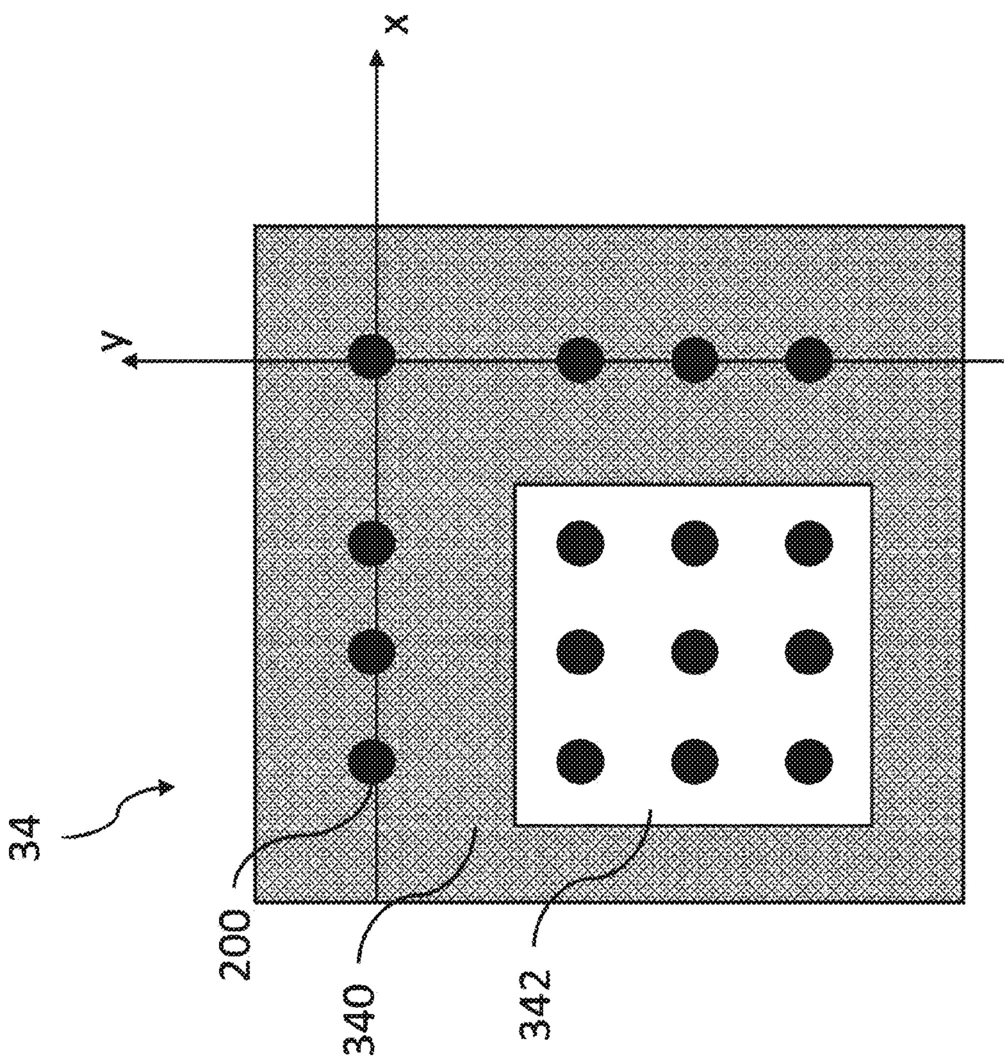

FIG. 4B shows a corresponding filter element 34. For example, the entirety of partial laser beams 200 into which the laser beam 20 has been split by the deflectors 30, 32 can have a regular spatial offset with respect to one another that provides radio-frequency and low-frequency spatial frequency components in the transformation plane. In this case, the low-frequency spatial components are arranged for example at the origin of the coordinate system, while the radio-frequency frequency components generate signals at a large distance from the coordinate system origin.

The filter element 34 can have transparent partial regions 342 and opaque partial regions 340 here. It is thus possible to filter specific spatial frequency components out of the transformation plane. For example, it is hereby also possible to filter out the zero order of diffraction.

Figures 5A, 5B, 5C:
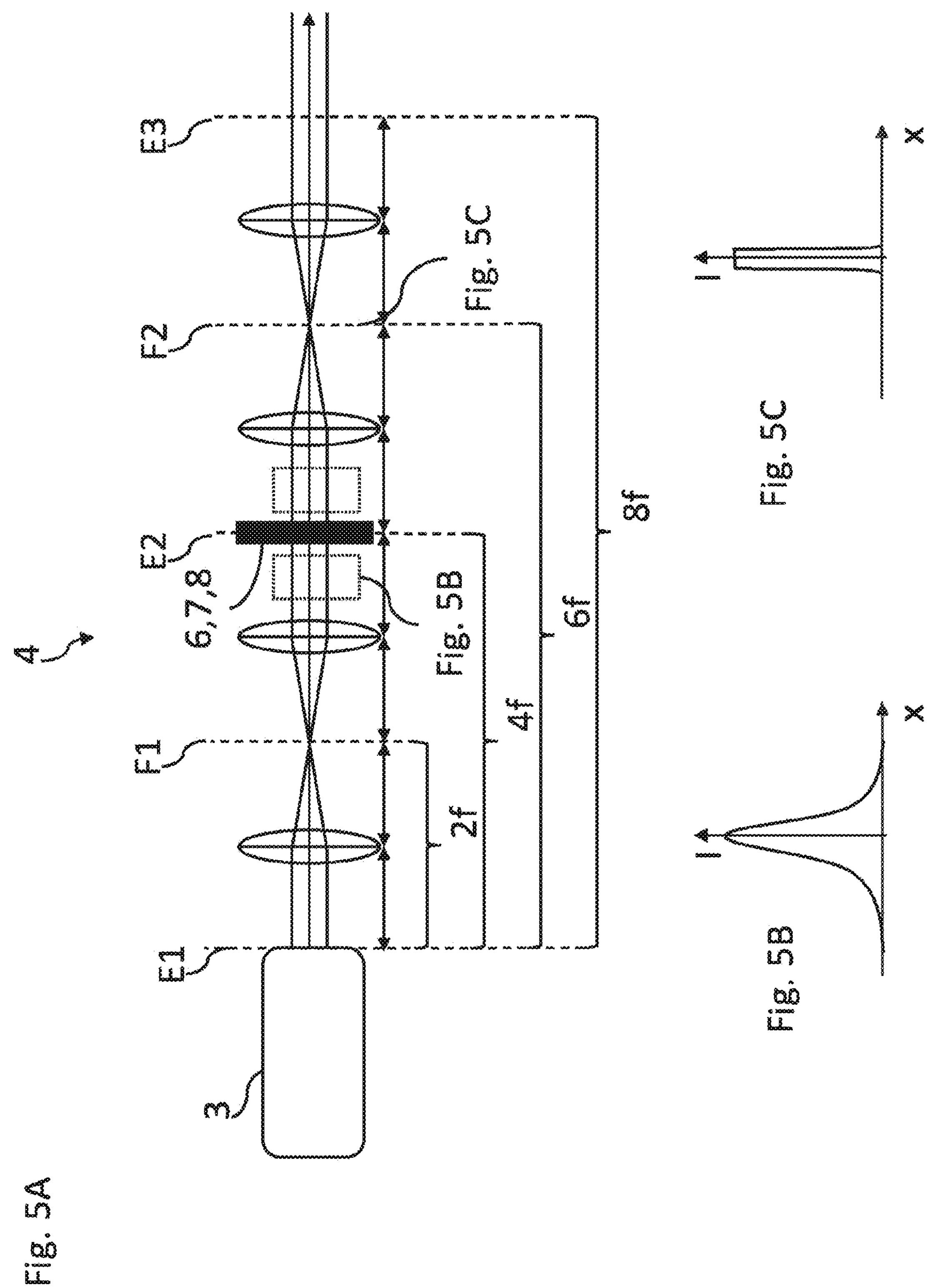
FIGS. 5A, 5B, 5C, and 5D show a schematic illustration of the Fourier optics arrangement with a beam-shaping element, and various beam cross sections according to some embodiments.

FIG. 5A shows a further possible implementation of the apparatus with a Fourier optics arrangement 4. The downstream transformation optics arrangement 4 can extend behind the front deflector plane E1. The front deflector plane E1 is transitioned here through the component arrangement for example into the corresponding front deflector plane E2. The transformation plane F1 is transitioned through the transformation optics arrangement 4 into the corresponding transformation plane F2. The corresponding deflector plane E2 is then transitioned through the transformation optics arrangement 4 into the corresponding deflector plane E3, etc.

The transformation optics arrangement 4 can also be made up of a plurality of transformation optics arrangements, in particular Fourier optics arrangements, to thus form an Nf optical unit, with N being a natural even number. What is relevant here is only that the last produced plane coincides with the focal plane of the added component. In this way, any desired number of image planes and transformation planes can be created into which in each case for example one filter element can be inserted.

In FIG. 5A, a beam-shaping element 6 is introduced in the corresponding deflector plane E2. A beam-shaping element 6 can here be, for example, a diffractive optical element that can convert for example a Gaussian beam profile in FIG. 5B into a flat-top beam profile in FIG. 5C.

For example, the laser beam 20 has a Gaussian beam profile upstream of the corresponding deflector plane E2, which means that the beam cross section perpendicular to the beam propagation direction of the laser beam 20 is a Gaussian bell curve, as is schematically indicated as a lateral beam cross section in FIG. 5B. As the laser beam 20 passes through the diffractive optical element 6, a flat-top beam profile is imposed on it. A flat-top beam profile has an equal intensity over the beam cross section and drops very quickly at the margin of the beam to a negligible intensity, as is schematically indicated as a lateral beam cross section in FIG. 5C.

A flat-top beam profile here has the advantage that homogeneous processing of a material in a processing plane is possible. In particular, a flat-top beam profile has the advantage that even somewhat complicated beam shapes can be shaped from the flat-top beam profile, for example by further filtering in a corresponding transformation plane or a corresponding deflector plane.

Rather than a beam-shaping element 6, it is possible for a beam splitting unit 7 to be inserted in the corresponding deflector plane E2 or another corresponding deflector plane in FIG. 5A.

Furthermore, a beam deflection unit 9, preferably what is known as a galvanometer scanner, which deflects the laser beam can also be mounted in a corresponding deflector plane, for example the plane E3. Using a galvanometer scanner, typically a further offset of the beams is produced, and as a result the specified angle offset can be increased, for example.

Figure 5D:
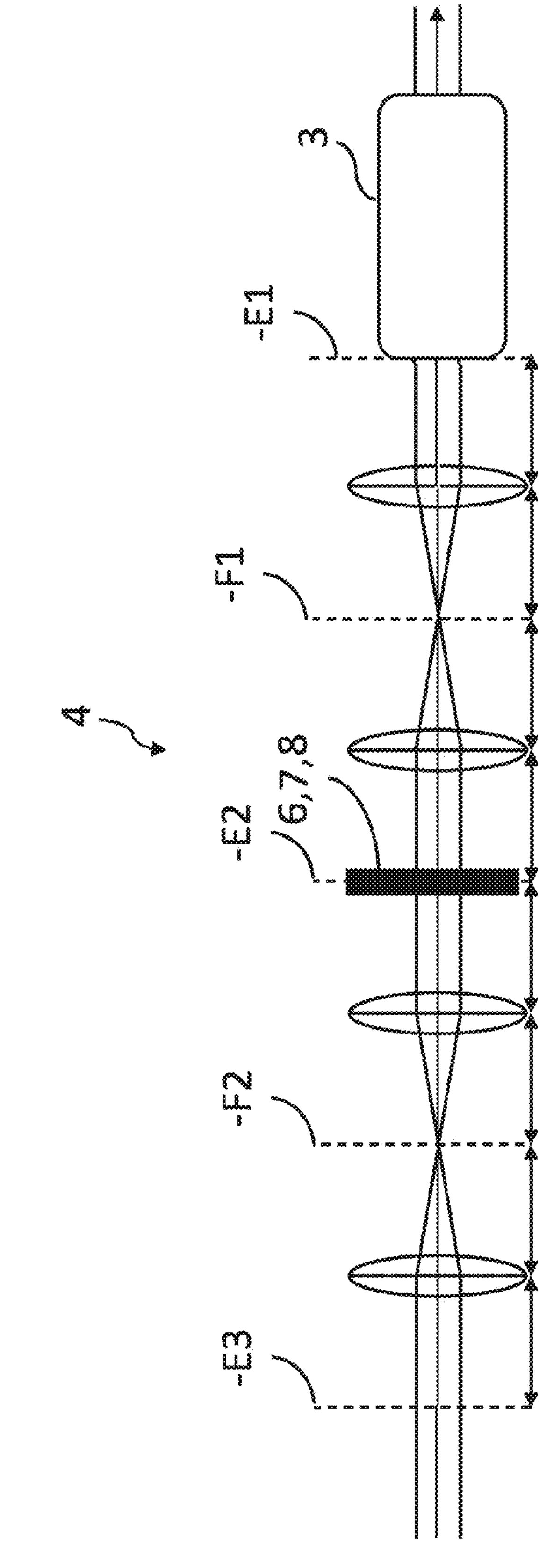

FIG. 5D shows the rearward planes of the deflector unit 3, the references of which are provided with a negative sign. Beam-shaping elements 6, 7, 9 can also be inserted into the rearward transformation plane or deflector planes in order to bring about beam-shaping in this way before the laser beam is deflected by the deflector unit 3.

Figures 6A, 6B, 6C:
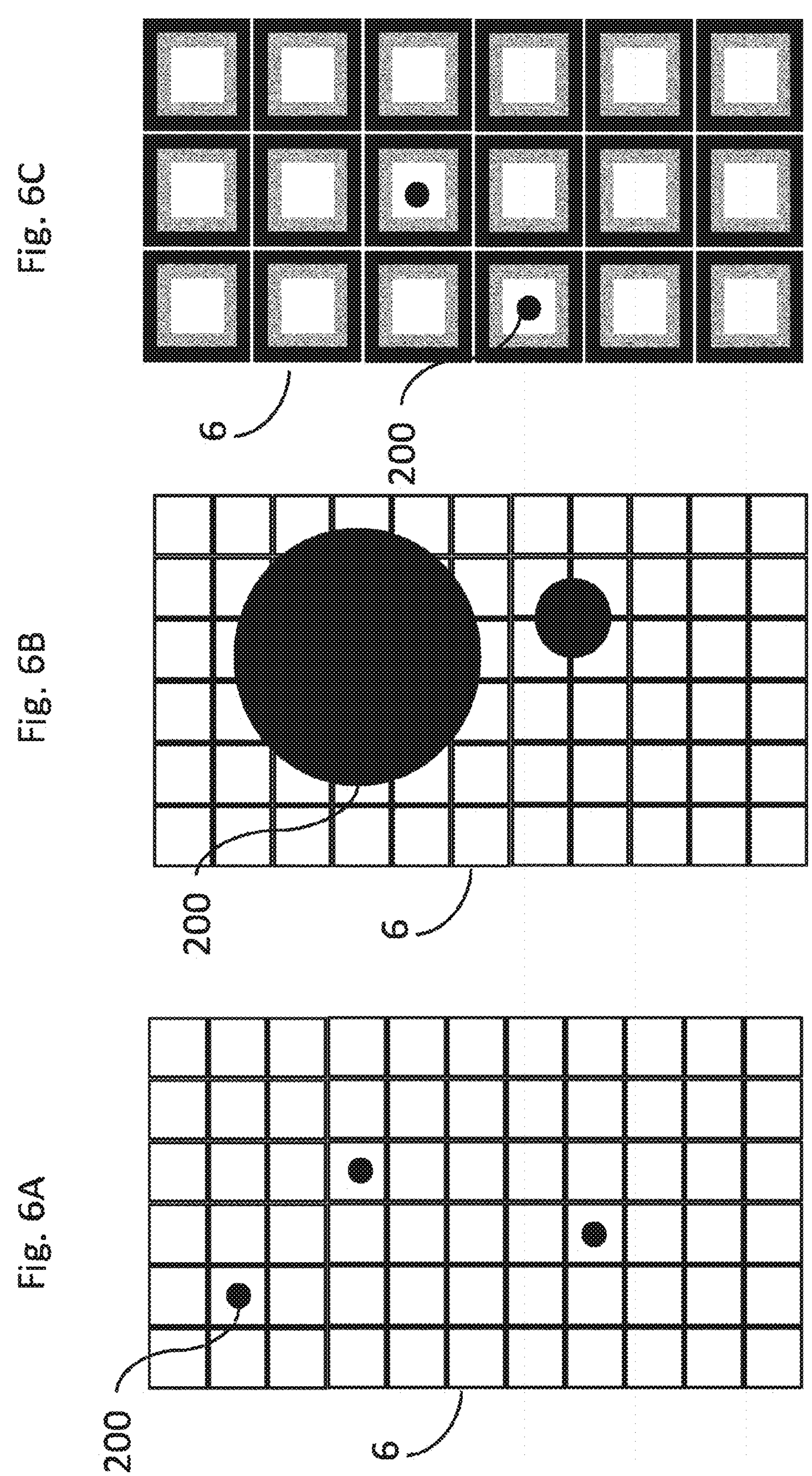
FIGS. 6A, 6B, 6C, and 6D show various rasterized beam-shaping elements according to some embodiments.
Figure 6D:
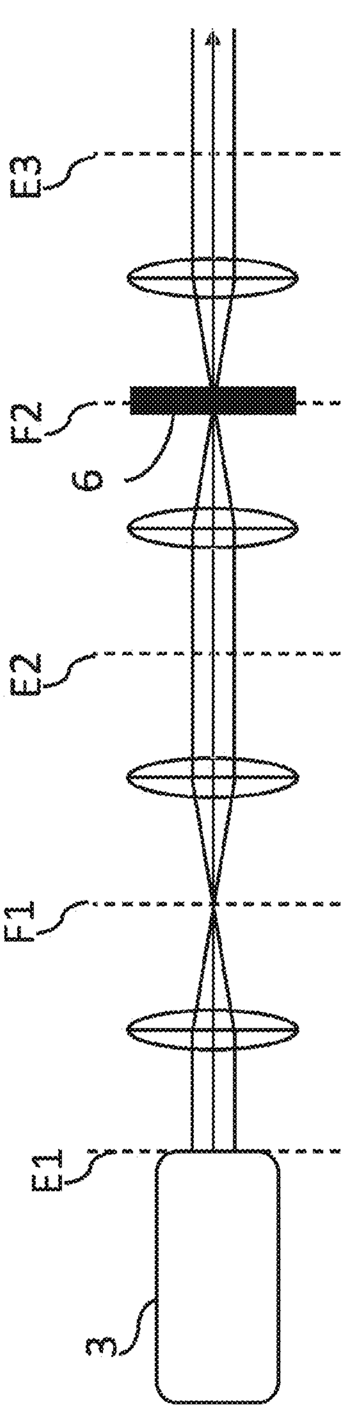

FIGS. 6A to 6C show different rasterized beam-shaping elements 6, whereas FIG. 6D shows the associated optical set-up. The laser beam 20, or a partial laser beam 200, can be guided into a specific raster element of the rasterized beam-shaping element 6. For example, FIG. 6A shows that the partial laser beam 200 is successively guided into three different raster elements, with the result that the partial laser beams are influenced in accordance with the raster elements. In particular, it is possible using multispot geometry to produce a beam geometry in which three partial beams 200 simultaneously pass through the three different raster elements shown. Generally, the raster elements are arranged, compared with conventional beam-shaping elements, in or close to transformation planes.

FIG. 6B shows a beam-shaping element 6, wherein a partial laser beam 200 or a laser beam 20 or a multispot geometry is guided onto a plurality of raster elements of the rasterized beam-shaping element 6. For example, this rasterization can be provided by the pixel cells of a spatial light modulator. However, rasterization can be carried out by grouping pixel cells and pixel regions. The phase component, intensity component or polarization component of the laser beam 20 can be influenced by each raster element, or each pixel. It is thus possible that the beam profile of the laser beam 20 is manipulated by controlling the different pixel elements. For example, such a manipulation can produce a laser beam having a flat-top beam profile from a Gaussian beam profile.

FIG. 6C shows a rasterized beam-shaping element 6, wherein each raster element is its own phase mask. When the laser beam 20 passes through this phase mask, the phase front of the laser beam 20 can be influenced and thus both the propagation direction and also the beam profile, and the phase front in general.

In particular, all raster elements can be individually set in the shown FIGS. 6A to 6C, and so each raster element brings about individual beam-shaping. For example a raster element can make a flat-top beam profile from a Gaussian beam profile, while another raster element imposes an elliptical beam shape or merely rotates the polarization by a specific angle or merely attenuates the laser beam 20 or merely deflects it, etc. In particular, the raster elements of the beam-shaping element 6, as in the case of the spatial light modulator, can also be controllable together or individually.

FIG. 6D shows the associated optical set-up from FIG. 5A, wherein the beam-shaping element 6 is arranged here in the plane F2 but can alternatively also be arranged in the plane F1.

FIGS. 7A to 7D show how the periodicity of the electronic control signal from the control device determines the deflection of the incident laser beam 20 in an acousto-optic deflector 30, 32. To that end, the acoustic wave in the optical material of the acousto-optic deflector 30, 32 is shown as a representative of the acousto-optic deflector 30, 32, with the wave having a periodicity that has the frequency of the electronic control signal.

Figures 7A, 7B, 7C, 7D:
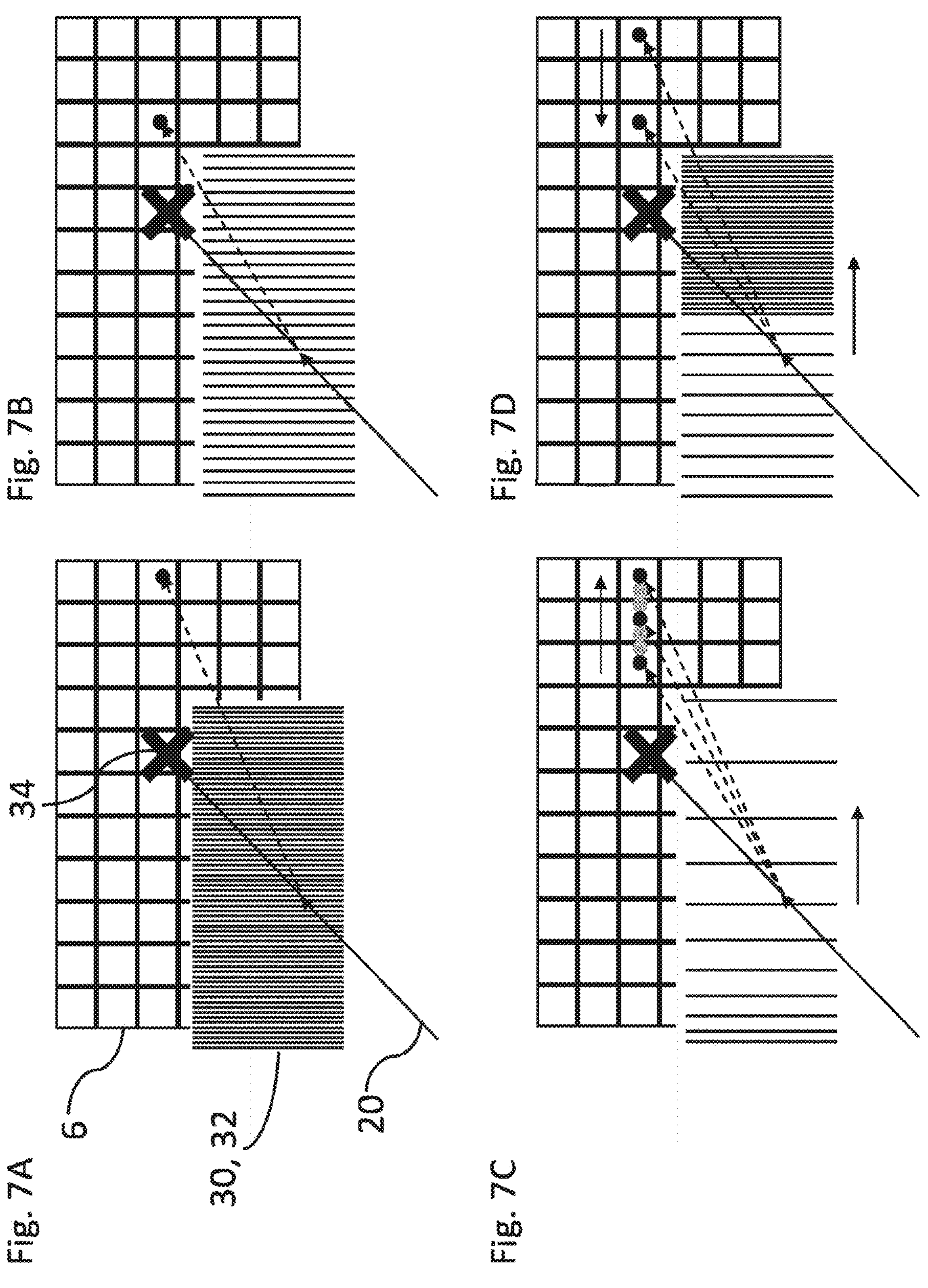
FIGS. 7A, 7B, 7C, and 7D show the schematic mode of functioning of an acousto-optic deflector unit in conjunction with a beam-shaping element according to some embodiments.
Figure 8:
FIG. 8 shows a schematic illustration of the processing optical unit according to some embodiments.
Figure 8:
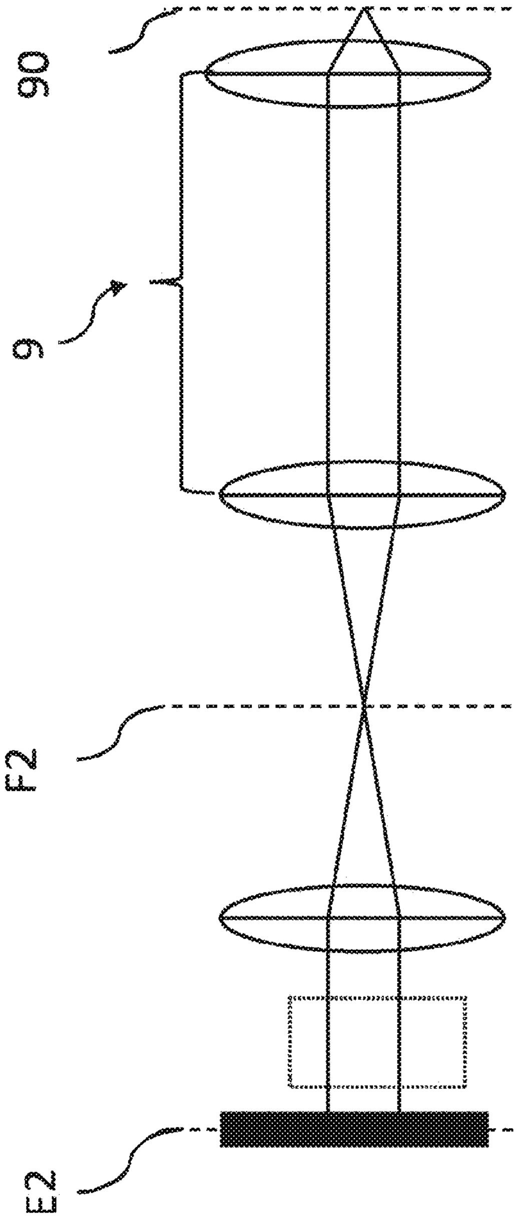

FIG. 7A shows an acoustic wave in an acousto-optic deflector 30, 32. For example, the acousto-optic deflector is what is known as a traveling-wave modulator. The acoustic wave has a very small periodicity, or a high spatial frequency. The incident laser beam 20 is diffracted at the resulting optical grating, wherein the zero order of diffraction is removed by a stop apparatus (not shown) from the beam path (marked by a cross). The partial beam 200 which was diffracted away from the zero order of diffraction by a diffraction angle $\alpha$ remains in the beam path. The partial beam 200 is then (after it has traveled through an optical component which is not shown) incident on the rasterized beam-shaping element 6 in the transformation plane, wherein the partial beam 200 is steered onto a specific raster element.

FIG. 7B shows the same set-up as in FIG. 7A, but the periodicity of the optical grating is significantly larger, as a result of which the spatial frequency is smaller. The imposed diffraction angle $\alpha$ is therefore significantly smaller in comparison with FIG. 7A, as a result of which the partial beam 200 travels closer to the zero order of diffraction. Accordingly, the partial beam 200 is steered onto a different specific raster element than in FIG. 7A.

In FIG. 7C, the acoustic wave producing the optical grating propagates from the left to the right while the laser beam 20 is incident on the grating. In the present case, the distances of the optical grating for the points of incidence of the laser beam become smaller over time, which means that the periodicity of the optical grating decreases and the spatial frequencies consequently increase. The distance variation of the optical grating here occurs for example continuously, with the result that the partial beam is shifted via the rasterized beam-shaping element 6, wherein the partial beam sweeps over a plurality of raster elements. However, due to a matching of the laser pulses with the wave field, it is in particular possible to also achieve discrete control of the raster elements, see below. It should be noted that, when using ultrashort laser pulses, the diffraction structure for the propagation time of the pulse through the deflector can be considered to be constant over time.

FIG. 7D shows the same apparatus as in 7A to 7C, wherein the acoustic wave is now not varied regarding its periodicity continuously but jumps from a very small periodicity to a very large periodicity. This can be achieved for example by a control signal having a different frequency suddenly being applied to the acousto-optic deflector 30, 32 by the control device 5. The variation in the periodicity occurs suddenly for the incident laser beam 20 on the optical grating, and so the partial beam 200 jumps from one raster element to a different raster element. Here, the beam does not sweep over the raster elements located between the starting and target raster elements.

In particular, changing of the frequency can be synchronized with the pulsed laser in such a way that the frequency change in the acousto-optic deflector 30, 32 takes place precisely when no laser pulse is emitted by the ultrashort pulse laser.

However, during the synchronization of the applied frequency or the acoustic field in the acousto-optic deflector with the laser, the specifications of the various apparatuses used, in particular the laser and the frequency source of the acousto-optic deflector unit, needs be taken into account. For example, a longitudinal acoustic wave in quartz (that is to say in the acousto-optic deflector) typically has a speed of 5700 m/s. The acoustic field has an extent of 3-5 mm so that changing of the entire acoustic field takes place in less than 1 ns (this is how long the acoustic field takes to propagate by 5 mm). A change in the frequency within the acoustic field, for example for shaping the beam, takes place in significantly less time than 1 ms, for example in less than 100 ns.

The laser pulses and the acoustic fields, for synchronization purposes, need to be consequently synchronized with one another preferably to less than 20 ns. The frequencies for operating the acousto-optic deflector unit range from 1 MHz to 500 MHz, wherein the switching times of the frequencies typically are less than 500 ns at 200 MHz. The repetition rates of the laser typically lie in the range of less than 100 MHz.

Figure 9:
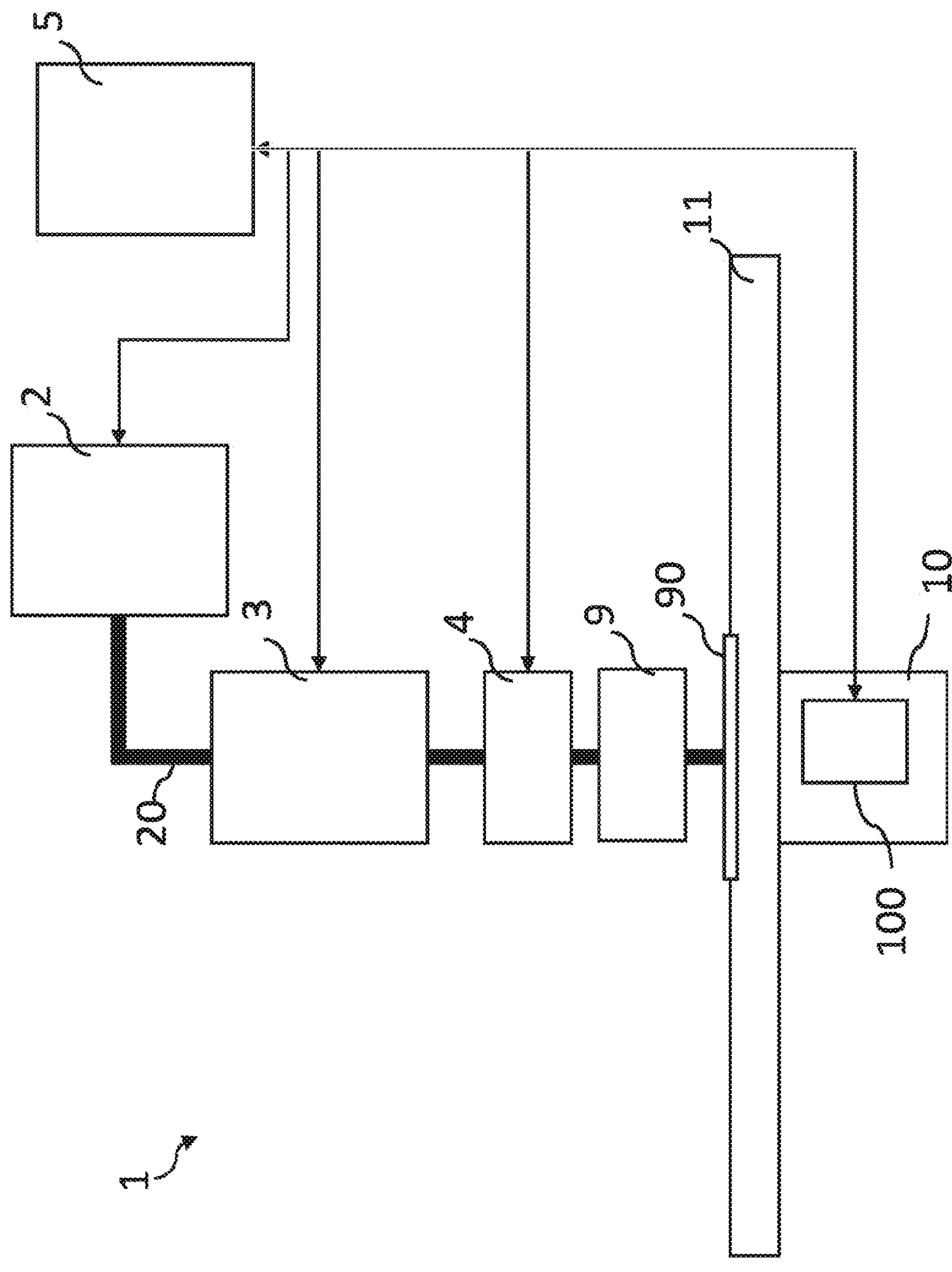
FIG. 9 shows a schematic illustration of the beam influencing system comprising a feed apparatus and feedback axis encoder according to some embodiments.

FIG. 9 shows a further embodiment of the apparatus 1, wherein the apparatus 1 has a feed apparatus 10 on which a material 11 to be processed can be attached. In particular, the feed apparatus 10 can be used to bring the material into the image-side focal plane of the processing optical unit, with the result that the laser beams that are influenced by the optical system can be introduced into the material 11. By introducing the laser beams 20 into the material 11, processing of the material 11 that corresponds to the laser beams 20 or the laser beam geometry can be performed.

For this purpose, the feed apparatus 10 can move the material 11 held thereon in relation to the laser beam, as a result of which the laser beam is guided over the material. In particular, the feed apparatus can be guided along a specific feed trajectory with a feed such that the laser energy is introduced into the material along this feed trajectory.

Furthermore, the feed apparatus 10 can be connected to the control apparatus 5, and in this way the control apparatus 5 and the feed apparatus 10 can exchange control signals.

In particular, it is thus possible to move along the feed trajectory while, synchronously therewith, the laser beams can be deflected using the acousto-optic deflector unit 3, can be guided through beam-shaping elements 6, 7, 8, and the laser beams thus manipulated can be imaged into the material 11 in order to achieve processing of the material 11 in this way.

In order to synchronize these processes, the laser 2 can be, for example, a pulsed laser that has a fundamental frequency, what is known as the seed frequency. The seed frequency can be transmitted to the control apparatus 5, with the result that a common time base can be provided in the entire apparatus 1. The control apparatus 5 is now able to coordinate the various processes or process steps in the individual dynamically occupiable subunits of the apparatus 1.

For example, it is possible in this way to compensate for the beam offset by way of a relative movement between the workpiece 11 and the processing optical unit 9 between two pulses in the focal plane of the processing optical unit and to then reposition it on the workpiece preferably between two successive pulses.

Figures 10A, 10B:
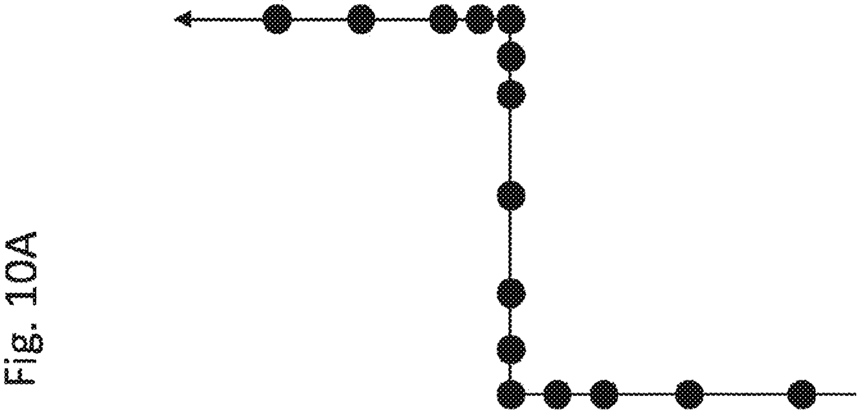
FIGS. 10A and 10B show a schematic illustration of the processing of a material along a feed trajectory with and without compensating for the feed rate by way of the deflector unit according to some embodiments.

Alternatively, for example a specified beam offset between two laser pulses can also be realized in connection with feed units that are subject to inertia. For example, due to inertia, the distance between the points of incidence of the laser pulses in the material 11 can change in dependence on the feed rate, as is shown in FIG. 10A. This behavior is a problem in particular in curves or corners of the feed trajectory where, while using feed apparatuses that are subject to inertia, the feed rate is typically reduced. At a fixed repetition frequency of the pulsed laser, the distance between the laser pulses is therefore varied, which can lead to inhomogeneous processing of the material 11.

The feed rate variations can be compensated for using the deflector unit 3, as is shown in FIG. 10B, and so laser pulses can be introduced into the material 11 at fixedly defined distances. In this way, significantly more even processing is possible, and in particular any undesired overlap of the pulses and overheating of the material 11 is avoided thereby.

It is to be understood that the overlap of the positioning by means of a deflector unit 3 that is not limited by inertia with further feed units or beam movement units which are subject to inertia enables not only the compensation, as explained by way of example, of a relative movement or change in the speed of the relative movement, but allows controlled positioning of successive pulses in or on the workpiece, wherein thereby a processing field becomes addressable that is scaled in comparison with the work field that is to be covered by means of the deflector unit alone. In order to ensure such compensation or controlled positioning, the feed apparatus 10 can have at least one axis encoder 100, wherein the axis encoder 100 is connected to the control apparatus 5. The control apparatus 5 can read the axis encoder position that is correlated to the instantaneous position or orientation of the feed apparatus 10 from the axis encoder 100. In particular, the axis encoder position can be read synchronously with the fundamental pulse frequency of the laser 2.

Since the instantaneous position and the exact time of the feed apparatus 10 of the control apparatus 5 are now known, the control apparatus 5 can calculate a corresponding position error and compensate for it via control of the deflector unit 3 by repositioning the laser beam. Accordingly, the position error of the feed apparatus 10 is compensated for by adapting the control signal to the deflector unit 3. Due to the overlaid inertia-free beam positioning using the deflector unit 3, the variation in the pulse frequency of the pulsed laser 2 can thus be avoided and the material throughput can be optimized in this way.

Insofar as applicable, all individual features presented in the exemplary embodiments can be combined with one another and/or interchanged, without departing from the scope of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Apparatus
2 Laser
20 Laser beam
200 Partial laser beam
3 Pulse-precise deflector unit
30 First pulse-precise deflector
300 Entrance opening
302 Zero order of diffraction
304 First order of diffraction
32 Second pulse-precise deflector
320 Entrance opening
322 Zero order of diffraction
324 First order of diffraction
34 Filter element
4 Transformation optics arrangement
4' Further transformation optics arrangement
40 First component
400 First focal length
42 Second component
420 Second focal length
5 Control apparatus
6 Beam-shaping element
7 Beam splitting unit
8 Beam deflection unit
9 Processing optical unit
90 Processing plane
10 Feed
100 Axis encoder
11 Material
E1 Front deflector plane E2 Corresponding deflector plane
F1 Transformation plane
F2 Corresponding transformation plane

The invention claimed is:

1. An apparatus for influencing a laser beam from an ultrashort pulse laser, the apparatus comprising:

a pulse-precise deflector unit comprising a first pulse-precise deflector, a second pulse-precise deflector, and a filter element, wherein the laser beam is coupled into an input of the first pulse-precise deflector, and the first pulse-precise deflector is configured to deflect the laser beam in a first direction perpendicular to the beam propagation direction, thereby imposing upon the laser beam a first angle offset, wherein, after the laser beam has traveled through the first pulse-precise deflector, the laser beam is coupled into an input of the second pulse-precise deflector with the first angle offset, and the second pulse-precise deflector is configured to deflect the laser beam in a second direction perpendicular to the beam propagation direction and the first direction, thereby imposing upon the laser beam a second angle offset in addition to the first angle offset, wherein the filter element is arranged between the first pulse-precise deflector and the second pulse-precise deflector and is configured to filter out a zero order of diffraction of the first pulse-precise deflector, or the filter is arranged downstream of the second pulse-precise deflector and is configured to filter out a zero order of diffraction of the pulse-precise deflector unit downstream of the second pulse-precise deflector, a transformation optics arrangement having at least two components arranged downstream of the pulse-precise deflector unit, wherein the transformation optics arrangement is configured to transform a spatial deflection and/or an angular deflection of the laser beam into the angular deflection and/or the spatial deflection, and/or transform the spatial deflection and the angular deflection inversely, by using a space-to-angle transformation and/or an angle-to-space transformation, and a processing optical unit arranged downstream of the transformation optics arrangement and configured to guide the laser beam into an image-side focal plane of the processing optical unit.

2. The apparatus as claimed in claim 1, wherein the first pulse-precise deflector comprises a first acousto-optic deflector, and the second pulse-precise deflector comprises a second acousto-optic deflector.

3. The apparatus as claimed in claim 2, wherein at least one of the first acousto-optic deflector and the second acousto-optic deflector comprises a phased array transducer and has a diffraction efficiency of over 75% over an exit region of at least 0.05°.

4. The apparatus as claimed in claim 1, further comprising a beam-shaping element arranged in a corresponding deflector plane or in a transformation plane or in a corresponding transformation plane, wherein the beam-shaping element is configured to impose upon the laser beam an intensity distribution and/or phase distribution and/or polarization distribution.

5. The apparatus as claimed in claim 4, further comprising a scanner configured to move the beam-shaping element perpendicular to the beam propagation direction, wherein beam deflection of the pulse-precise deflector unit and movement of the scanner are synchronously matched to one another.

6. The apparatus as claimed in claim 1, further comprising a beam splitting unit arranged in a corresponding pulse-precise deflector plane or in a transformation plane or in a corresponding transformation plane, wherein the beam splitting unit is configured to adapt an angle offset of the pulse-precise deflector unit.

7. The apparatus as claimed in claim 1, further comprising a beam deflection unit arranged in a corresponding pulse-precise deflector plane or in a transformation plane or in a corresponding transformation plane, wherein the beam deflection unit is configured to deflect the laser beam.

8. The apparatus as claimed in claim 1, further comprising a beam clean-up element arranged in a corresponding processing plane.

9. The apparatus as claimed in claim 1, further comprising a rasterized beam-shaping element arranged in a corresponding processing plane, the rasterized beam-shaping element comprising a plurality of raster elements, wherein each raster element is an individual beam-shaping partial element.

10. The apparatus as claimed in claim 9, further comprising a control device for controlling the pulse-precise deflector unit, wherein the control device is configured to bring about deflection of the laser beam in such a way that each pulse of the laser beam is incident on a different raster element of the rasterized beam-shaping element, or the laser beam is directed to a specific raster element, or the laser beam sweeps over the plurality of raster elements, or a plurality of partial laser beams are guided in a targeted manner to the plurality of raster elements.

11. The apparatus as claimed in claim 1, wherein the processing optical unit together with a second element of the transformation optics arrangement is designed as a telescope having a reducing effect with a large numerical aperture and a short focal length, and/or is embodied as a transmissive or reflective optical unit.

12. The apparatus as claimed in claim 1, further comprising a feed apparatus configured to pick up a material to be processed, arrange the material in an image-side focal plane of the processing optical unit, and move the material relative to the laser beam, so that the laser beam is guided over the material.

13. The apparatus as claimed in claim 12, wherein the feed apparatus is connected to a control apparatus for exchanging control signals, and the control apparatus is configured to adapt a position of the feed apparatus in relation to control of the pulse-precise deflector unit.

14. The apparatus as claimed in claim 13, wherein the feed apparatus has at least one axis encoder, wherein the control apparatus is configured to read an axis encoder position, the laser is configured to specify for the control apparatus a fundamental frequency for controlling clock for deflecting the laser beam by the pulse-precise deflector unit and for reading the axis encoder position, wherein the control apparatus is configured to calculate in real time a position error for a subsequent pulse from a current axis encoder position, wherein the control apparatus is configured to correct the position error by adapting the control signal of the pulse-precise deflector unit.

15. An apparatus for influencing a laser beam from an ultrashort pulse laser, the apparatus comprising:

a pulse-precise deflector unit comprising a first pulse-precise deflector, a second pulse-precise deflector, and a polarization rotation device, wherein the laser beam is coupled into an input of the first pulse-precise deflector, and the first pulse-precise deflector is configured to deflect the laser beam in a first direction perpendicular to the beam propagation direction, thereby imposing upon the laser beam a first angle offset, wherein, after the laser beam has traveled through the first pulse-precise deflector, the laser beam is coupled into an input of the second pulse-precise deflector with the first angle offset, and the second pulse-precise deflector is configured to deflect the laser beam in a second direction perpendicular to the beam propagation direction and the first direction, thereby imposing upon the laser beam a second angle offset in addition to the first angle offset, and wherein the polarization rotation device is positioned downstream of the first pulse-precise deflector and upstream of the second pulse-precise deflector, wherein the polarization rotation device is configured to rotate a polarization of the laser beam.

16. The apparatus as claimed in claim 15, further comprising:

a further transformation optics arrangement having two components, wherein the further transformation optics arrangement is configured to transform the spatial deflection and/or the angular deflection of the laser beam into the angular deflection and/or the spatial deflection, and/or transform the spatial deflection and the angular deflection inversely, using the space-to-angle and/or the angle-to-space transformation, and a filter element arranged in a transformation plane of the further transformation optics arrangement, wherein the filter element is configured to filter out a zero order of diffraction.

17. An apparatus for influencing a laser beam from an ultrashort pulse laser, the apparatus comprising:

a pulse-precise deflector unit configured to deflect the laser beam in at least one direction perpendicular to a beam propagation direction, a transformation optics arrangement having at least two components arranged downstream of the pulse-precise deflector unit, wherein the transformation optics arrangement is configured to transform a spatial deflection and/or an angular deflection of the laser beam into the angular deflection and/or the spatial deflection, and/or transform the spatial deflection and the angular deflection inversely, by using a space-to-angle transformation and/or an angle-to-space transformation, and a processing optical unit arranged downstream of the transformation optics arrangement and configured to guide the laser beam into an image-side focal plane of the processing optical unit, wherein the transformation optics arrangement is a Fourier optics arrangement, and the at least two components of the transformation optics arrangement includes a first component and a second component, wherein an exit of the pulse-precise deflector unit is arranged between the first component and an object-side focal plane of the first component, wherein an image-side focal plane of the first component coincides with an object-side focal plane of the second component, wherein the exit of the pulse-precise deflector unit is imaged between the second component and an image-side focal plane of the second component, and wherein the laser beam in the image-side focal plane of the second component is deflectable in accordance with a deflection by the pulse-precise deflector unit.

* * * * *